US011800171B2

(12) United States Patent
Gonder et al.

(10) Patent No.: US 11,800,171 B2
(45) Date of Patent: Oct. 24, 2023

(54) APPARATUS AND METHODS FOR RECORDING A MEDIA STREAM

(71) Applicant: Time Warner Cable Enterprises LLC, St. Louis, MO (US)

(72) Inventors: Tom Gonder, Broomfield, CO (US); John Chen, Ashburn, VA (US); Vipul Patel, Upper Holland, PA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 16/261,164

(22) Filed: Jan. 29, 2019

(65) Prior Publication Data

US 2019/0158906 A1  May 23, 2019

Related U.S. Application Data

(62) Division of application No. 14/220,021, filed on Mar. 19, 2014, now abandoned.

(51) Int. Cl.
*H04N 21/262* (2011.01)
*H04N 21/845* (2011.01)
(Continued)

(52) U.S. Cl.
CPC ....... *H04N 21/278* (2013.01); *H04N 21/2187* (2013.01); *H04N 21/2668* (2013.01);
(Continued)

(58) Field of Classification Search
CPC ..................... H04N 21/26258; H04N 21/4825
See application file for complete search history.

(56) References Cited

U.S. PATENT DOCUMENTS 4,195,351 A  3/1980 Barner et al.
6,636,238 B1  10/2003 Amir et al.
(Continued)

FOREIGN PATENT DOCUMENTS

CA  2941117 A1  9/2015
EP  3120565 A2  1/2017
(Continued)

OTHER PUBLICATIONS

Ting H., et al. "Trick Play Schemes for Advanced Television Recording on Digital VCR," IEEE, 1995, pp. 1159-1168.
(Continued)

*Primary Examiner* — Brian T Pendleton
*Assistant Examiner* — Frank Johnson
(74) *Attorney, Agent, or Firm* — Patent Beach PC

(57) ABSTRACT

Apparatus and methods for recording a media stream for use by a rendering device. In one embodiment, a client device records live, unbound streaming media content from a Content Delivery Network (CDN) in "chunks" according to a data structure such as a manifest file. The live media content stream chunks are compressed and stored for later playback. The client device uses information regarding the chunks to generate a local manifest file, which it then uses to reconstruct the media stream. A video client may also dynamically insert and account for updated secondary content (such as advertisements) during each playback instance, thus enabling the service provider to realize commercial opportunities which were previously not possible. Various operational/business rules are also disclosed for e.g., enabling and disabling functions with respect to playback of the content.

41 Claims, 6 Drawing Sheets

(51) Int. Cl.

| | |
|---|---|
| *H04N 21/278* | (2011.01) |
| *H04N 21/2187* | (2011.01) |
| *H04N 21/433* | (2011.01) |
| *H04N 21/472* | (2011.01) |
| *H04N 21/61* | (2011.01) |
| *H04N 21/643* | (2011.01) |
| *H04N 21/2668* | (2011.01) |
| *H04N 21/81* | (2011.01) |
| *H04N 21/44* | (2011.01) |
| *H04N 21/258* | (2011.01) |

(52) U.S. Cl.
CPC ... *H04N 21/26258* (2013.01); *H04N 21/4332* (2013.01); *H04N 21/4334* (2013.01); *H04N 21/472* (2013.01); *H04N 21/6125* (2013.01); *H04N 21/6175* (2013.01); *H04N 21/64322* (2013.01); *H04N 21/812* (2013.01); *H04N 21/8456* (2013.01); *H04N 21/25825* (2013.01); *H04N 21/44008* (2013.01)

(56) References Cited

U.S. PATENT DOCUMENTS

| | | |
|---|---|---|
| 7,602,820 B2 | 10/2009 | Helms et al. |
| 7,954,131 B2 | 5/2011 | Cholas et al. |
| 8,484,511 B2 | 7/2013 | Engel et al. |
| 8,520,850 B2 | 8/2013 | Helms et al. |
| 8,621,540 B2 | 12/2013 | Apsangi et al. |
| 8,660,181 B2 | 2/2014 | Streater et al. |
| 8,713,623 B2 | 4/2014 | Brooks |
| 8,799,943 B1 | 8/2014 | Sherwin et al. |
| 8,813,124 B2 | 8/2014 | Tidwell et al. |
| 8,826,347 B1 | 9/2014 | Earle |
| 8,863,164 B1 | 10/2014 | Mick, Jr. et al. |
| 8,917,977 B2 | 12/2014 | Hamada et al. |
| 8,924,580 B2 | 12/2014 | Begen et al. |
| 8,930,979 B2 | 1/2015 | Tidwell et al. |
| 8,997,136 B2 | 3/2015 | Brooks et al. |
| 9,066,115 B1 | 6/2015 | Cherry et al. |
| 9,066,138 B1* | 6/2015 | Kraiman ............ H04N 21/2668 |
| 9,083,513 B2 | 7/2015 | Helms et al. |
| 9,170,700 B2 | 10/2015 | Kaiser |
| 9,215,423 B2 | 12/2015 | Kimble et al. |
| 9,710,469 B2* | 7/2017 | Chen .................. G06F 16/43 |
| 10,375,452 B2 | 8/2019 | Hardin et al. |
| 11,089,373 B2 | 8/2021 | Chittella et al. |
| 2001/0042249 A1* | 11/2001 | Knepper ............ H04N 7/17318 |
| | | 348/E7.071 |
| 2002/0135621 A1 | 9/2002 | Angiulo et al. |
| 2002/0164149 A1 | 11/2002 | Wilkinson |
| 2003/0028505 A1* | 2/2003 | O'Rourke ................ H04N 7/16 |
| 2003/0056217 A1 | 3/2003 | Brooks |
| 2003/0071971 A1 | 4/2003 | Jo |
| 2005/0123381 A1 | 6/2005 | Weeden et al. |
| 2005/0183120 A1* | 8/2005 | Jain .................... H04N 7/17336 |
| | | 725/86 |
| 2005/0210145 A1 | 9/2005 | Kim et al. |
| 2005/0227773 A1* | 10/2005 | Lu ....................... H04N 21/4181 |
| | | 348/E7.071 |
| 2005/0262529 A1 | 11/2005 | Neogi et al. |
| 2006/0025869 A1 | 2/2006 | Virdi et al. |
| 2006/0130113 A1 | 6/2006 | Carlucci et al. |
| 2006/0161563 A1 | 7/2006 | Besbris et al. |
| 2006/0225118 A1* | 10/2006 | Rolls .................. H04N 21/6125 |
| | | 348/E7.071 |
| 2007/0058926 A1 | 3/2007 | Virdi et al. |
| 2007/0136742 A1 | 6/2007 | Sparrell |
| 2007/0147389 A1 | 7/2007 | Qing |
| 2007/0237225 A1 | 10/2007 | Luo et al. |
| 2007/0253699 A1 | 11/2007 | Yen et al. |
| 2008/0015999 A1 | 1/2008 | Ali et al. |
| 2008/0016196 A1* | 1/2008 | MacMillan ........... H04L 67/125 |
| | | 709/223 |
| 2008/0077866 A1 | 3/2008 | Margulis |
| 2008/0104644 A1 | 5/2008 | Sato et al. |
| 2008/0168133 A1 | 7/2008 | Osborne |
| 2008/0181575 A1 | 7/2008 | Girard et al. |
| 2008/0205644 A1 | 8/2008 | Lee et al. |
| 2008/0235351 A1 | 9/2008 | Banga et al. |
| 2008/0235746 A1 | 9/2008 | Peters et al. |
| 2008/0276173 A1 | 11/2008 | Li |
| 2008/0313691 A1 | 12/2008 | Cholas et al. |
| 2009/0052870 A1* | 2/2009 | Marsh ................ H04N 21/4583 |
| | | 386/292 |
| 2009/0079840 A1 | 3/2009 | Gandhi et al. |
| 2009/0100459 A1* | 4/2009 | Riedl .................. H04N 21/2405 |
| | | 725/35 |
| 2009/0165067 A1 | 6/2009 | Bruckman et al. |
| 2009/0190652 A1 | 7/2009 | Kim et al. |
| 2010/0125882 A1* | 5/2010 | Athias ................. H04N 21/812 |
| | | 725/88 |
| 2010/0175088 A1 | 7/2010 | Loebig et al. |
| 2010/0251304 A1 | 9/2010 | Donoghue et al. |
| 2010/0251305 A1 | 9/2010 | Kimble et al. |
| 2010/0319044 A1* | 12/2010 | Agans ...................... H04N 5/76 |
| | | 725/115 |
| 2011/0016482 A1 | 1/2011 | Tidwell et al. |
| 2011/0050860 A1 | 3/2011 | Watson |
| 2011/0067049 A1 | 3/2011 | Piepenbrink et al. |
| 2011/0080940 A1 | 4/2011 | Bocharov et al. |
| 2011/0103374 A1 | 5/2011 | Lajoie et al. |
| 2011/0110515 A1 | 5/2011 | Tidwell et al. |
| 2011/0138019 A1* | 6/2011 | Bae .................. H04N 21/23103 |
| | | 709/219 |
| 2011/0283311 A1* | 11/2011 | Luong ............... H04N 21/44213 |
| | | 725/28 |
| 2012/0011225 A1 | 1/2012 | Keum et al. |
| 2012/0030314 A1 | 2/2012 | Kim et al. |
| 2012/0030723 A1 | 2/2012 | Baum et al. |
| 2012/0036537 A1* | 2/2012 | Klappert .......... H04N 21/47214 |
| | | 725/50 |
| 2012/0047542 A1 | 2/2012 | Lewis et al. |
| 2012/0159542 A1* | 6/2012 | Minwalla ............. H04N 21/812 |
| | | 725/36 |
| 2012/0173751 A1 | 7/2012 | Braness et al. |
| 2012/0179834 A1 | 7/2012 | Van Der Schaar et al. |
| 2012/0185905 A1 | 7/2012 | Kelley et al. |
| 2012/0210216 A1 | 8/2012 | Hurst |
| 2012/0284747 A1* | 11/2012 | Joao ................... H04N 21/6581 |
| | | 725/32 |
| 2013/0044996 A1* | 2/2013 | Bhogal ..................... H04N 9/79 |
| | | 386/326 |
| 2013/0046849 A1 | 2/2013 | Wolf et al. |
| 2013/0061045 A1 | 3/2013 | Kiefer et al. |
| 2013/0067052 A1 | 3/2013 | Reynolds et al. |
| 2013/0104162 A1 | 4/2013 | Helms et al. |
| 2013/0111517 A1 | 5/2013 | Dillon et al. |
| 2013/0188926 A1* | 7/2013 | Rajagopalan ...... H04N 21/4147 |
| | | 386/248 |
| 2013/0282876 A1* | 10/2013 | Watanabe ........ H04N 21/47202 |
| | | 709/219 |
| 2013/0318629 A1 | 11/2013 | Lajoie et al. |
| 2014/0040026 A1* | 2/2014 | Swaminathan ........ G06Q 30/00 |
| | | 705/14.66 |
| 2014/0108585 A1 | 4/2014 | Barton et al. |
| 2014/0164760 A1 | 6/2014 | Hybertson et al. |
| 2014/0189743 A1* | 7/2014 | Kennedy ................ H04N 21/84 |
| | | 725/46 |
| 2014/0230003 A1* | 8/2014 | Ma .................... H04N 21/47217 |
| | | 725/115 |
| 2014/0237520 A1* | 8/2014 | Rothschild ......... H04N 21/4334 |
| | | 725/88 |
| 2014/0237522 A1* | 8/2014 | Rothschild ....... H04N 21/23805 |
| | | 725/88 |
| 2014/0245346 A1 | 8/2014 | Cheng et al. |
| 2014/0355624 A1 | 12/2014 | Li et al. |
| 2015/0006752 A1 | 1/2015 | O'Hare et al. |
| 2015/0074399 A1* | 3/2015 | Nugent ............. H04N 21/4334 |
| | | 713/168 |
| 2015/0089557 A1 | 3/2015 | Busse et al. |

(56) References Cited

U.S. PATENT DOCUMENTS

| | | |
|---|---|---|
| 2015/0095460 A1* | 4/2015 | Berger .................. H04L 67/59 709/219 |
| 2015/0095511 A1 | 4/2015 | McGowan et al. |
| 2015/0127845 A1* | 5/2015 | Phillips ............ H04N 21/26258 709/231 |
| 2015/0256843 A1 | 9/2015 | Roskowski |
| 2015/0261600 A1 | 9/2015 | Iturralde et al. |
| 2015/0271234 A1 | 9/2015 | O'Malley et al. |
| 2015/0271541 A1 | 9/2015 | Gonder et al. |
| 2015/0373385 A1 | 12/2015 | Straub et al. |
| 2016/0103830 A1 | 4/2016 | Cheong et al. |
| 2016/0164841 A1* | 6/2016 | Mikhailov .............. G06F 21/57 726/12 |
| 2016/0165173 A1 | 6/2016 | Lesh |
| 2016/0323617 A1* | 11/2016 | Marchand ........ H04N 21/64322 |
| 2016/0330764 A1 | 11/2016 | Kim et al. |
| 2017/0127298 A1 | 5/2017 | Ryu et al. |
| 2017/0171766 A1 | 6/2017 | Amizur |
| 2017/0244926 A1* | 8/2017 | Kotab .................. H04N 21/2747 |
| 2018/0014041 A1 | 1/2018 | Chen et al. |
| 2019/0069004 A1 | 2/2019 | Badawiyeh |
| 2020/0037046 A1 | 1/2020 | Hardin et al. |
| 2020/0314461 A1 | 10/2020 | Chen et al. |
| 2021/0281893 A1 | 9/2021 | Badawiyeh |

FOREIGN PATENT DOCUMENTS

| | | |
|---|---|---|
| EP | 3687175 A1 | 7/2020 |
| JP | 2013524618 A | 6/2013 |
| JP | 2017519382 A | 7/2017 |
| JP | 2019208210 A | 12/2019 |
| WO | WO-2013058684 A1 | 4/2013 |
| WO | WO-2015142741 A2 | 9/2015 |

OTHER PUBLICATIONS

Zhangf G., et al., "Implementing Hierarchical Trick Play for HTTP Video Streaming", IEEE, 2010, pp. 465-468.

Zhu P., et al,. "Trick Play Function for VOD with SVC Source," IEEE, 2010, pp. 255-259.

* cited by examiner

APPARATUS AND METHODS FOR RECORDING A MEDIA STREAM

Priority

This application is a divisional of and claims priority to co-owned and co-pending U.S. patent application Ser. No. 14/220,021 of the same title filed Mar. 19, 2014, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, and/or audio) over networks, such as an Internet Protocol Television (IPTV) network, or the Internet; and specifically in one aspect to recording streaming media content in a network so as to enable subsequent reconstruction of the media content.

2. Description of Related Technology

Existing Digital Video Recorder (DVR) solutions enable a consumer electronics device or application software to record video in a digital format for storage onto computer readable media such as e.g., a disk drive, Universal Serial Bus (USB) flash drive, local or networked mass storage device, etc. Traditionally, the recorded video content is stored in its entirety in a compressed and encoded format. During playback, the recorded file is decompressed and decoded by the video player e.g., of the portable device, set-top box (STB), etc. One common example of a recording file format includes without limitation, MPEG-4 (Motion Picture Experts Group) wrapped 11.264 video.

Unfortunately, existing recording file formats cannot support certain types of applications. For instance, existing DVR devices cannot record live streaming content. As a brief aside, live streaming videos (also commonly referred to as "Live Internet Protocol (IP) video delivery") are typically not stored in their entirety on the Content Delivery Network (CDN) due to storage costs and/or the nature of "live" content (the content is generated at time of delivery and may be "unbounded"; i.e., the endpoint is unknown or imprecisely known). Instead, Live IP video delivery from a video server to a video client is based on a sequence of small Hyper Text Transport Protocol (HTTP) based file downloads; each download consists of a small "chunk" of an unbounded transport stream. These chunks are then assembled sequentially by the video client and decoded for playback. Since live video streams are unbounded, the CDN stores just enough chunks at the network to support live playback from the client. For example, a video client might "buffer" ten (10) 6-second chunks (a minute of playback) during normal operation.

It is also worth noting that since the video client does not have the content in its entirety, the video client cannot compress the content for local storage (which is necessary for traditional DVR functionality). Moreover, storing the content in its uncompressed form can quickly deplete the memory resources of the video client (especially a small consumer device with limited memory, such as, an iPad™, etc.)

Network DVR (NDVR) is one proposed solution for enabling live streaming content DVR functionality for customer devices. In proposed NDVR solutions, the video service provider stores and manages (via e.g., Digital Rights Management (DRM), subscriber account based authorization, etc.) the content for each subscriber account, and streams the video back to the video client during playback requests. Such NDVR solutions require that the video client is connected to the service provider network and has a consistent bandwidth connection that supports quality video playback. Since the video stream is generated and delivered by the service provider network, NDVR cannot support off-network playback or playback where network connectivity is spotty and/or sporadic. Moreover, even though the video storage provider is likely to have significantly more storage capacity, such a solution is inefficient and does not scale well for large subscriber populations and/or live streams.

Additionally, recorded video content represents somewhat of a "lost" revenue opportunity for the service provider. Specifically, advertising revenue is typically determined based on the number of "views" of commercial advertisements or promotions. During peak programming (e.g., the Super Bowl, etc.), merchants purchase advertisement space at a premium because it is likely to have significant viewership. However, once video content has been recorded, subsequent viewings of the video content does not result in additional revenue for the service provider. For example, an advertisement for light beer during the Super Bowl is replayed each time the recorded Super Bowl content is replayed, but there is no mechanism to identify such replays, or in any way extract benefit from them (other than perhaps the indirect benefit of the viewer being enticed to buy the product). Ideally, the service provider would be compensated each time the advertisement is replayed, and/or be able to dynamically insert different advertisements (e.g., corn chips, etc.) in subsequent replays.

Finally, existing DVR recorded content is static and transferrable once generated. For example, consider typical video client based DVR operation: the video client receives the entirety of the video content which has been formatted according to the video client's resolution (e.g., 640×480). The video content is decrypted, compressed, and encoded into the appropriate file format (e.g., MPEG-4 wrapped H.264). Thereafter, the file can be replayed at a different device, which creates a myriad of problems. First, if the other device has a different resolution (e.g., 1920×1080), the playback will still be limited to the original resolution and will produce undesirable "pixelated" (blocky) low quality video. Second, many DRM protections (authentication, authorization, etc.) are managed by the video client; in some cases, the video client software can be easily circumvented, or is otherwise inadequate to prevent playback in an illicit manner. Piracy is an industry-wide concern, and accounts for billions of dollars of revenue that is lost each year.

Based on the foregoing, it is clear that while prior art solutions have generally recognized the benefits of DVR functionality, technical limitations are present which limit the use of DVR and/or adversely affect commercial profitability. Accordingly, a mechanism for recording streaming video content in a manner that enables a video client to reconstruct the content dynamically (rather than merely providing for static playback) is needed. Such mechanisms should preferably be able to accommodate playback on devices other than the device which recorded the content, intelligently account for secondary content (e,g., advertising or promotion) playback, and/or implement appropriate playback restrictions. Lastly, these methods and apparatus would in certain implementations require only minimal changes to existing systems, thereby leveraging the installed infrastructure and electronics bases as much as possible.

SUMMARY

The present disclosure addresses the foregoing needs by providing, inter alia, methods and apparatus for recording streaming media content in a network. In one embodiment, the content is recorded using a data structure (e.g., a stream manifest file) so as to enable subsequent reconstruction of the media content from the stream manifest file.

In one aspect, a method for recording a live media stream is disclosed. In one embodiment, the method comprises: (i) receiving a network data structure associated with the live media stream, the live media stream generated at a first time within substantial proximity to a second time of reception, (ii) downloading one or more content portions from a service provider based at least in part on the data structure, (iii) generating a local data structure, (iv) storing each of the one or more content portions in a corresponding location in a local memory, and (v) updating the local data structure with the corresponding location of each of the one or more content chunks.

In a second aspect, a method for playing a media stream from a local stream manifest is disclosed. In one embodiment, the method comprises: (i) retrieving a local stream manifest associated with the media stream, (ii) retrieving one or more content chunks from a local memory based at least in part on the local stream manifest, and (iii) reconstructing the media stream from the retrieved one or more content chunks based on the local stream manifest.

In a third aspect, a consumer premises equipment (CPE) is disclosed. In one embodiment, the CPE comprises: (i) a network interface, configured to communicate with a service provider network, (ii) a user interface, (iii) a processor in data communication with the network interface and user interface, and (iv) a non-transitory computer readable medium comprising one or more instructions, which when executed by the processor, are configured to cause the CPE to: download one or more content chunks from the service provider network in accordance with a network stream manifest, the network stream manifest comprising a dynamically changing manifest configured to deliver live media content comprising the one or more content chunks; generate a local stream manifest based at least in part on the network stream manifest; and store each of the one or more content chunks in a local storage device.

In another embodiment, the CPE comprises: a display; a processor; and a non-transitory computer readable medium comprising one or more instructions, which when executed by the processor, are configured to cause the CPE to: (i) retrieve a local stream manifest; (ii) retrieve one or more content chunks from a local memory in accordance with the local stream manifest; (iii) reconstruct a media content stream based at least in part on the retrieved one or more content chunks; and (iv) display the media content stream.

In a fifth aspect, a non-transitory computer readable medium is disclosed. In one embodiment, the computer readable medium comprises one or more instructions, which when executed by the processor, are configured to cause a device to: (i) download one or more content chunks from the service provider network in accordance with a network stream manifest, the network stream manifest comprising a dynamically changing manifest configured to deliver live media content comprising the one or more content chunks; (ii) generate a local stream manifest based at least in part on the network stream manifest; and (iii) store each of the one or more content chunks in a local storage device.

In another embodiment, the computer readable medium comprises one or more instructions, which when executed by the processor, are configured to cause a device to: (i) retrieve a local stream manifest; (ii) retrieve one or more content chunks from a local memory in accordance with the local stream manifest; (iii) reconstruct a media content stream based at least in part on the retrieved one or more content chunks; and (iv) display the media content stream.

These and other aspects shall become apparent when considered in light of the disclosure provided herein.

Figure 1:
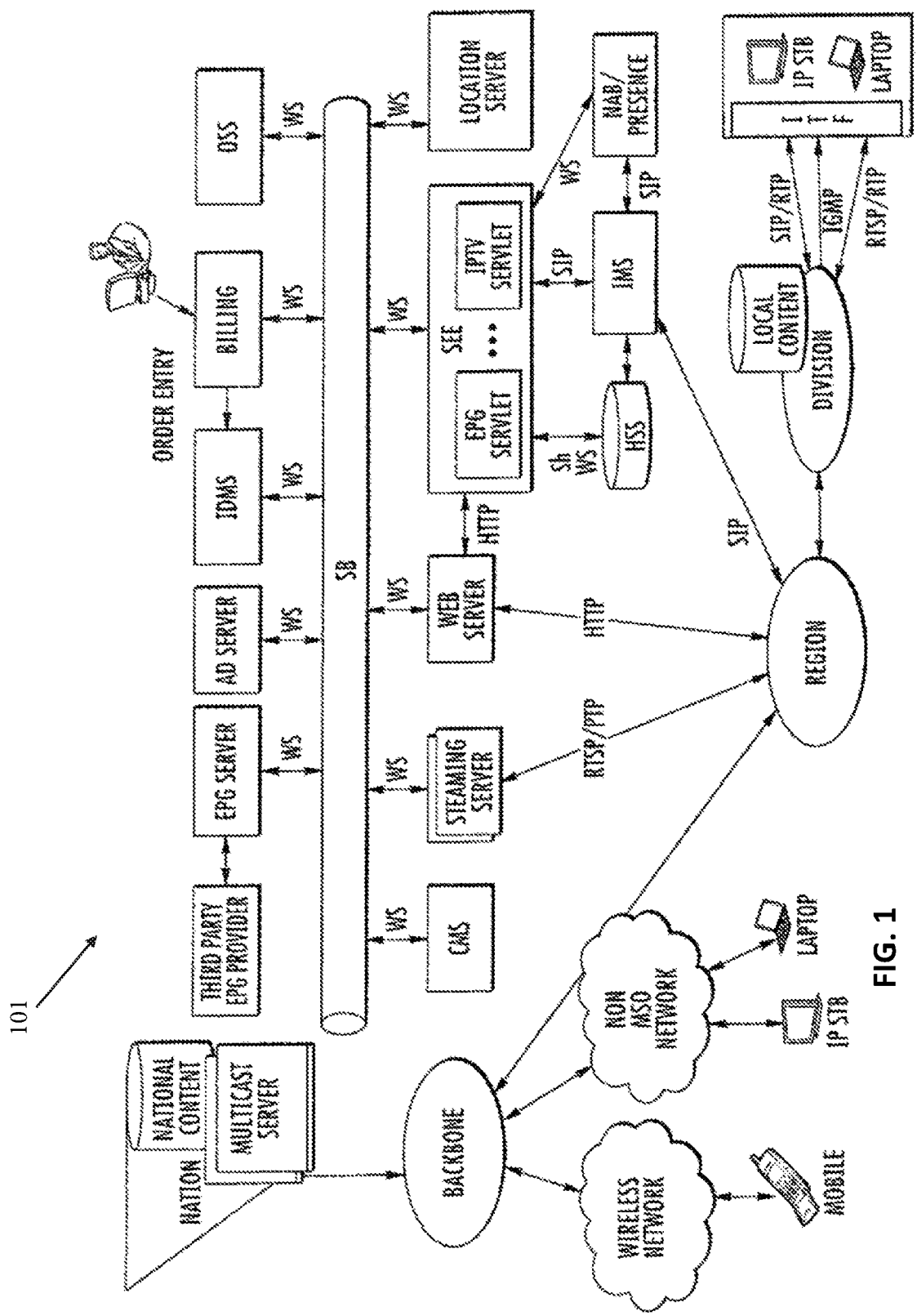
FIG. 1 is a functional block diagram illustrating one exemplary packetized content delivery network architecture useful with the present disclosure.

All figures Copyright 2014 Time Warner Enterprises LLC All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, c-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, a media client that records streaming media content from a Content Delivery Network (CDN) in portions or "chunks", and generates and/or stores a stream manifest file, is disclosed. In one exemplary embodiment, portions (or chunks) of live media content streams are compressed and stored for later playback as discrete content elements, rather than requiring the complete content stream to be compressed and stored as a whole. In this manner, the media client can record unbound streams (e.g., live video content, etc.). Recording in a "chunked" manner is generally more robust than traditional content recording schemes; interruptions and/or corrupted chunks can be easily corrected, skipped, and/or replaced at a later point without interfering with the decoding of other chunks. Moreover, during replay, a corrupted or missing chunk will not adversely affect the replay of other chunks.

In another aspect, a media client that replays stored "chunked" media content based on a stream manifest file is disclosed. In one exemplary embodiment, stored video content streams chunks are decompressed for playback based on information stored within an associated data structure (e.g., stream manifest file). Examples of information stored within the manifest file may include e.g., encryption keys, supported resolutions, and digital rights information.

In some embodiments, the video client may be further configured to retrieve additional data to augment the stored chunked video content. For instance, a video client with a high resolution (e.g., 1920×1080) display may consult the stream manifest file for missing and/or replacement chunks, when attempting to replay a previously recorded lower resolution recording (e.g., 640×480). By downloading the appropriate chunks, the video client can support the desired high resolution. In another example, a video client may dynamically insert and replace outdated or previously viewed advertisements during each subsequent playback; by tracking and updating advertisements, the service provider can realize commercial opportunities which were previously not possible.

Various other operational and/or business-related rules are disclosed for e.g., enabling and/or disabling functions with respect to playback of the requested content (e.g., entitlement based authentication and/or authorization schemes, etc.), providing content quality upgrades, providing targeted or tailored advertisements and/or programming, etc.

In addition, content protection schemes may be advantageously deployed at e.g., the gateway, the client device, and/or one or more network entities, consistent with the various aspects disclosed herein.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned hybrid fiber coax (HFC) cable architecture having a multiple systems operator (MSO), digital networking capability, IP delivery capability, and a plurality of client devices/CPE, the general principles and advantages of the disclosure may be extended to other types of networks and architectures that are configured to deliver digital media data (e.g., text, video, and/or audio). Such other networks or architectures may be broadband, narrowband, wired or wireless, or otherwise.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network Architecture

In one typical content delivery network configuration, content is provided from one or more content sources via one or more distribution servers to customer premises equipment (CPE). In one implementation, the distribution server(s), VOD servers and CPE(s) are connected via a bearer (e.g., HFC or satellite) network. A network headend (including various ones of the components listed above) may also be connected through a gateway or other such interface to unmanaged external internetworks such as the Internet.

The CPE as discussed herein includes any equipment in the "customers' premises" (or other locations, whether local or remote to the distribution server) that can be accessed by a network side entity such as a distribution server. As will be discussed in greater detail below, in one embodiment, the CPE may include IP-enabled CPE, and a gateway or specially configured modem (e.g., DOCSIS cable or satellite modem).

A typical headend architecture may include a billing module, subscriber management system (SMS) and CPE configuration management module, cable-modem termination system (CMTS) and OOB system, as well as LAN(s) placing the various components in data communication with one another.

The exemplary headend architecture further includes a multiplexer-encrypter-modulator (MEM) coupled to the network and adapted to process or condition content for transmission over the network. Distribution servers (coupled to the LAN) may access the MEM and network via one or more file servers. Information is carried across multiple channels, thus, the headend is adapted to acquire the information for the carried channels from various sources. Typically, the channels being delivered from the headend to the CPE ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE may use the out-of-band (OOB) or DOCSIS channels and associated protocols. The OCAP 1.0 (and subsequent) specification provides for exemplary networking protocols both downstream and upstream, although the disclosure is in no way limited to these exemplary approaches.

An optical transport ring is also commonly utilized to distribute the dense wave-division multiplexed (DWDM) optical signals to each hub within the network in an efficient fashion.

In another implementation, a so-called "broadcast switched architecture" (BSA), also known as "switched digital video" or "SDV", may be utilized. Switching architectures allow improved efficiency of bandwidth use for ordinary digital broadcast programs. Ideally, the subscriber is unaware of any difference between programs delivered using a switched network and ordinary streaming broadcast delivery.

Typically, in the BSA model, the headend contains switched broadcast control and media path functions which cooperate to control and feed, respectively, downstream or edge switching devices at the hub site which are used to selectively switch broadcast streams to various service groups. A BSA or SDV server is also disposed at the hub site, and implements functions related to switching and bandwidth conservation (in conjunction with a management entity at the headend).

Referring now to FIG. 1, an exemplary network architecture for providing optimized delivery of packetized content is shown. In addition to on-demand and broadcast content (e.g., video programming), the system of FIG. 1 also delivers Internet data services using the Internet protocol (IP), although other protocols and transport mechanisms of the type well known in the digital communication art may be substituted. Alternatively, or in addition, the network 100 could for example include an optical fiber network of the type known in the art using dense wave-division multiplexing (DWDM), Synchronous Optical Network (SONET) transport technology or gigabit Ethernet transport.

In one exemplary delivery paradigm MPEG-based video content is delivered, with the video transported to user PCs (or IP-based CPE) over the relevant transport (e.g., DOCSIS channels) comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels or other transport, such as via a multiplexed multi-program transport stream (MPTS). In this fashion, a parallel delivery mode to the normal broadcast delivery exists; e.g., in the cable paradigm, delivery of video content both over traditional downstream QAMs to the tuner of the user's SIB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs. Aggregation of television programs that include local and regional programming, or other types of content, occurs at the headend, where these programs are converted into a suitable transport format and a "channel line-up" is created for delivery to the downstream CPE.

The CPE of the exemplary embodiment are each configured to monitor the particular assigned RF channel (such as via a port or socket ID/address, or other such mechanism) for IP packets intended for the subscriber premises/address that they serve.

The "packet optimized" delivery network is used for carriage of the packet content (e.g., IPTV content) when the request issues from an MSO network. As illustrated in FIG. 1, an IMS (IP Multimedia Subsystem) network with common control plane and service delivery platform (SDP), as described in co-owned, co-pending U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK", incorporated herein by reference in its entirety may be utilized. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present disclosure are in no way limited to any of the foregoing architectures.

In the switched digital variant, the IP packets associated with Internet services are received by edge switch, and forwarded to the cable modem termination system (CMTS). The CMTS examines the packets, and forwards packets intended for the local network to the edge switch. Other packets are discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

Packetized Content Delivery Network Architecture for Recording Media

Figure 2:
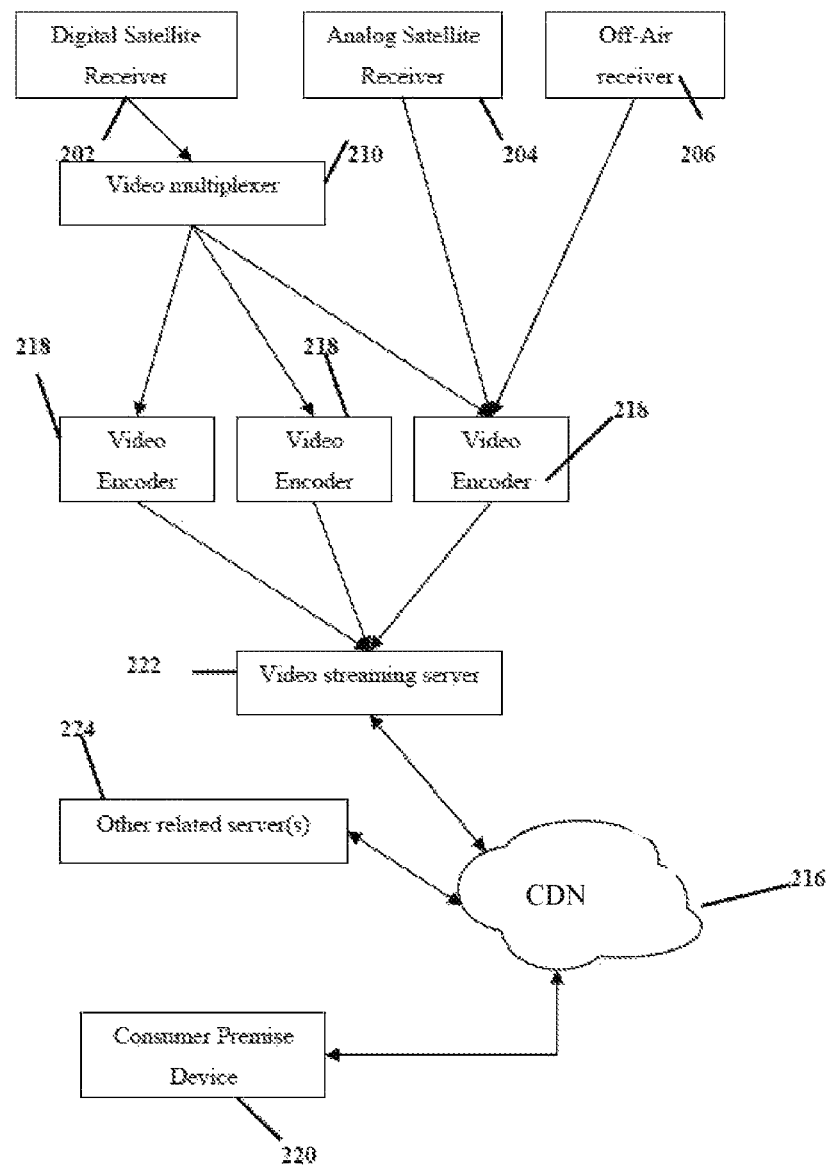
FIG. 2 is a graphical representation of an exemplary packet-switched network useful in conjunction with various principles described herein.

Referring now to FIG. 2, an exemplary configuration of a packet-switched network useful with the present disclosure is illustrated. While described in the context of an Internet Protocol Television (IPTV) network, it will be recognized that the principles of the disclosure can be extended to other transport modalities and network paradigms.

The network 200 of FIG. 2 effectively operates logically "along side" the in-band content delivery system described with respect to FIG. 1, and shares many common elements. It includes digital satellite receivers 202, analog satellite receivers 204 and off-air receivers 206 deployed within the content (e.g., cable) network in order to receive content such as broadcast television programs. This content is then distributed over the cable network. With respect to the IPTV network, the digital satellite feed received via the receiver 202 is sent to a video multiplexer 210 that provides one or more digital programs to one or more video encoders 218 to transcode/transrate or otherwise process incoming digital video streams to a format suitable for loading onto the video streaming server.

In addition, according to the present disclosure, the encoders 218 may be further utilized to generate a plurality of content chunks from a live IP content stream. The chunks may be of predetermined length. In addition, metadata describing the chunks may be generated at the encoders 218. As discussed herein, the file chunks form the basis for the generation of a network stream manifest file. In one variant, the network stream manifest is generated at the video streaming server 222. It is appreciated, however, that the foregoing functionality may be accomplished at various other network entities, the foregoing being merely exemplary.

The video streaming server 222 is connected to the Content Distribution Network 216 (which in the context of a cable network, may include, inter alia, the coaxial "drop" between the CPE and the previously referenced CMTS). Other architectural elements connected to the content distribution network 216 are shown as "other related servers" 224 in FIG. 2. Client devices 220 (such as PCs connected to cable modems, wireless user devices in communication with access points (APs) or gateways, etc.) are connected to the content distribution network and perform the functions of, inter cilia, decoding and displaying video signals.

Various content sources provide content to a content server (which may include the video streaming server 222 or other related servers 224) for delivery via the network to the CPE 220. For example, content may be received from a local, regional, or network content library as discussed in co-owned co-pending U.S. application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources (such as e.g., a web server) provide internet content to a packetized content server. Other IP content may also be received at the packetized content server, such as voice over IP (VoIP) and/or IPTV content. Content may also be received from subscriber and non-subscriber devices (e.g., a PC or smartphone-originated user made video). In one embodiment, the functionality of both the content server and packetized content server may be integrated into a single headend server entity. In another embodiment, an architecture similar to that disclosed in the co-owned, co-pending U.S. patent application Ser. No. 13/213,817 filed on Aug. 19, 2011 and entitled "APPARATUS AND METHODS FOR REDUCED SWITCHING DELAYS IN A CONTENT DISTRIBUTION NETWORK", which is incorporated herein by reference in its entirety, may be utilized. As discussed therein, a central media server located in the headend may be used as an installed backup to the hub media servers as (i) the primary source for lower demand services, and (ii) as the source of the real time, centrally encoded programs with PVR (personal video recorder) capabilities. By distributing the servers to the hub stations, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach can be utilized consistent with the disclosure. For example, one server configuration or architecture may be used for servicing cable, satellite, HFCu, etc. subscriber CPE-based session requests, while a different configuration or architecture may be used for servicing mobile client requests. Similarly, the content servers can either be single-purpose/dedicated (e.g., where a given server is dedicated only to servicing certain types of requests), or alternatively multi-purpose (e.g., where a given server is capable of servicing requests from multiple different sources).

In another embodiment, both IP data content and IP-packetized audio/video content are delivered to a user via one or more universal edge QAM devices. According to this embodiment, all of the content is delivered on DOCSIS channels, which are received by a premises gateway (not shown) and distributed to one or more CPE 220 in communication therewith. Alternatively, the CPE 220 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

It will be appreciated that several different configurations of the above-described IPTV network are possible consistent with the present disclosure. For example, the video encoders 218 shown in FIG. 2 may be configured to produce one or more bit streams for the same content. Such bit streams could have different bit rates as a function of suitability for transmission over the IP network (e.g., low, medium and high bitrate streams for various rate services, such as dial-up, DSL and cable modem IP services, respectively), and/or different encoding formats conforming to audio/video encoding standards such as Real or MPEG or Windows Media Player (WMP).

In another variant, elements in both the headend and CPE 220 are specially adapted to utilize transmission infrastructure to transmit and receive both multiplexed wideband content and legacy content as is described in co-owned, co-pending U.S. patent application Ser. No. 11/013,671 filed on Dec. 15, 2004 and entitled "METHODS AND APPARATUS FOR WIDEBAND DISTRIBUTION OF CONTENT", which is incorporated by referenced herein in its entirety. As discussed therein, the CPE 220 or gateway may be configured to contain multiple tuners (or a single wideband tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexer all of the streams resident within the statistical multiplex.

In another variant, IP simulcast content and existing on-demand, voice, and broadcast content are all provided to a headend switch device (not shown). The headend switch then provides the content to the optical ring for provision to one or more distribution hubs. IP simulcast content is in one exemplary implementation retrieved from a plurality of content sources at an IPTV server.

The IP-packet content is transmitted to subscriber devices via the universal edge QAM and the edge network. The IP video ("simulcast") content is presented to client devices capable of receiving content over the DOCSIS QAMs. For example, the aforementioned gateway device (as well as an advanced CPE such as an IP-enabled device may receive the IP simulcast. Legacy CPE (i.e., non-IP enabled devices) may receive content via the gateway device, or via an audio/video "back-up" MPEG transport stream.

It is further appreciated that content may be delivered to various Worldwide Interoperability for Microwave Access (WiMAX)-enabled mobile devices (e.g., PMD or non-legacy CPE) via a WiMAX distribution hub of the type now ubiquitous in the wireless arts. WiMAX is a wireless technology that provides high-throughput broadband connections over longer distances (as compared to short-range technologies such as WLAN, Bluetooth or PAN). WiMAX can be used for a number of applications, including "last mile" broadband connections, cellular backhaul, hotspot coverage, and high-speed enterprise connectivity, as well as broadband delivery to mobile devices.

Moreover, the aforementioned WiMAX technology may be used in conjunction with a WiMAX-enabled gateway (not shown) or CPE, such that content is delivered wirelessly to the gateway or CPE from the distribution hub, irrespective of the indigenous wired or optical distribution network infrastructure.

The content is received at the CPE 220 in the foam of the previously described content chunks. As will be discussed in greater detail below, the metadata relating to the chunks, and/or the network stream manifest are used to generate a local stream manifest at the CPE.

In one embodiment, the gateway device serves as a gateway to the IP content for other client devices (such as other CPE and PMD). The gateway device may communicate with one or more connected CPE, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

In another embodiment, content received at a first user CPE 220 may be transmitted to CPE 220 of other premises in a peer-to-peer (P2P) fashion. For example, first content may be requested and received at a first CPE 220. Then, when a second CPE 220 (in the same region or division) requests the same content, the request may be examined by a headend entity (not shown), or the gateway acting as a peer proxy, to determine that the requesting second device CPE 220 is entitled to receive the content and that the content is available at the first CPE 220. The headend entity directs a peer-to-peer communication to be established between the authorized second CPE 220 and the CPE 220 having the requested content. It is appreciated that while described herein in the context of a single CPE 220 providing content to a second CPE 220, several CPE 220 having the content thereon may be contacted for simultaneous delivery of the content to one or more second CPE 220. In one such implementation, the peer-to-peer communication methods and apparatus disclosed in co-owned, co-pending U.S. patent application Ser. No. 11/726,095 entitled "METHOD AND APPARATUS FOR CONTENT DELIVERY AND REPLACEMENT IN A NETWORK" filed on Mar. 20, 2007, which is incorporated herein by reference in its entirety, may be utilized in conjunction with the present disclosure. As discussed therein, these P2P methods and apparatus also advantageously improve the "robustness" or capability of the network with respect to ensuring that subscribers or other users can receive and access desired content when they want, as well as seamlessly repairing or reconstituting damaged or missed portions of that content (including even an entire streamed program, broadcast or download).

It is still further appreciated that the delivery of content may include delivery from an "off-net" distribution hub (not shown) to another network (not shown), not associated with the MSO. In this embodiment, a requesting device (such as CPE or gateway) may request content from a local headend which is transferred over both MSO-maintained ("on-net") and "off-net" networks advantageously.

Methods

As referenced above, various embodiments of the present disclosure are directed to schemes for: (i) recording streaming media content in a network via one or more data structures (e.g., stream manifest file(s)), and (ii) subsequent media content reconstruction from the data structure(s).

Figure 3:
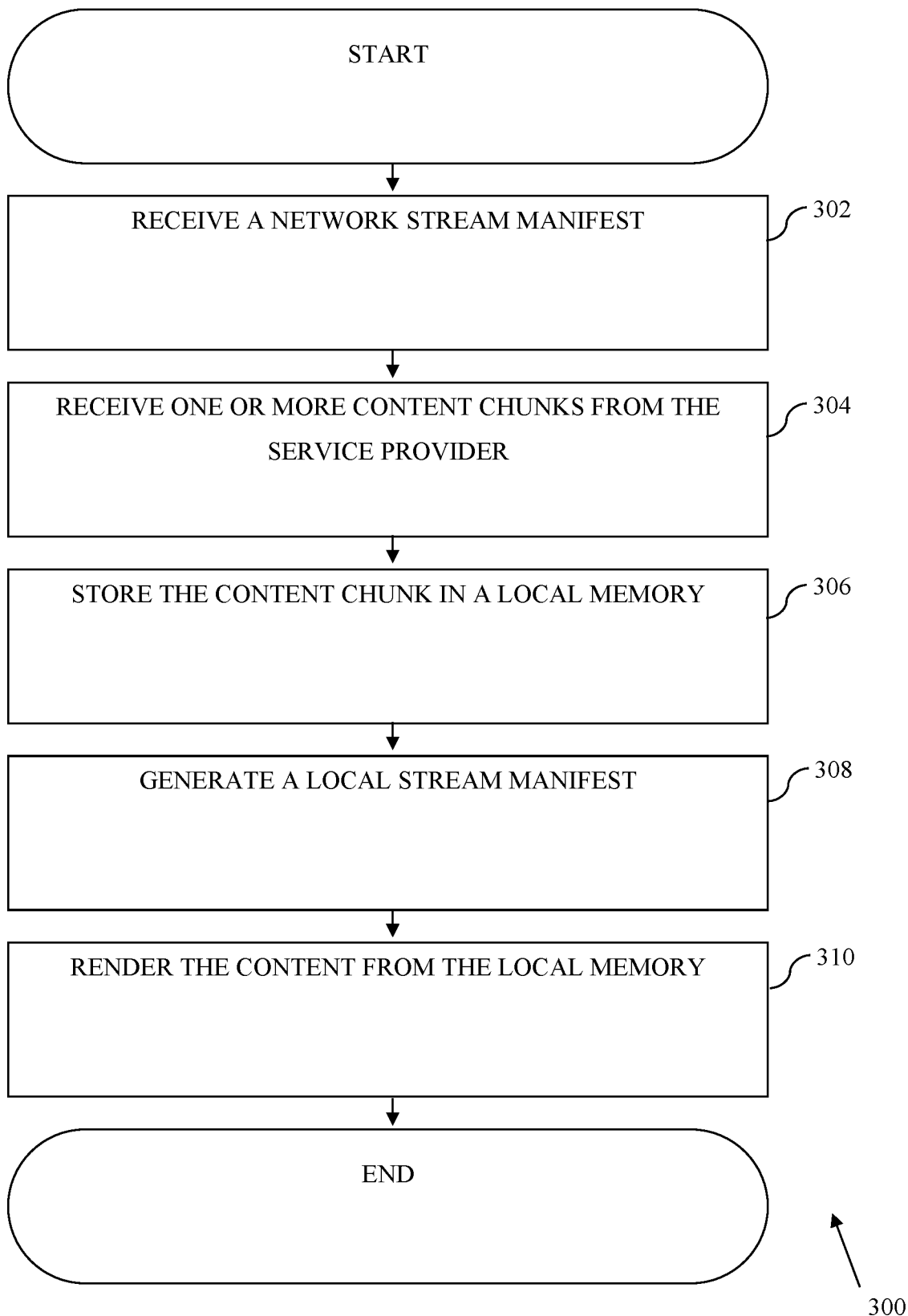
FIG. 3 is a logical flow diagram representing one embodiment of a method for recording streaming media content.

Referring now to FIG. 3, one embodiment of a method 300 for recording streaming media content in a local device via a data structure such as stream manifest file is disclosed.

At step 302 of the method 300, the media client device receives a network stream manifest (also referred to as a "playlist") from the service provider. In one embodiment, the media client device is a portable device. Common examples of portable devices include, without limitation, tablets, phablets, smart phones, smart televisions (TVs), desktop and laptop personal computers (PC), and portable media players. In other embodiments, the media client device may comprise a file server; file servers are common in both commercial and residential use. For example, a subscriber may have a PC which can play media files, but which also serves his/her other consumer electronics (e.g., smart phone and tablet).

In one embodiment, the network stream manifest includes metadata, and a listing of media chunk entries. Metadata refers to information used by the media client device to interpret or otherwise manage the media chunks (metadata is also colloquially referred to as "data about data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metatdata describes the media chunks, and can be used as a reference file when assessing or otherwise making use of the media chunks.

In one implementation, the listing of media chunk entries in the manifest comprises a listing of network addresses where the corresponding chunks of media content may be accessed and/or downloaded. For instance, each of the media chunk entries may be listed by a Uniform Resource Locator (URL). In some embodiments, the entries may be in computing resource "path" format. Computing paths may be either absolute (i.e., the path provides the fully elaborated and unique location of the chunk in a file structure) or relative (i.e., the path provides a relative location of the chunk in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

For example, in some cases the service provider or MSO is represented as a single logical entity (a single network domain) represented by a characteristic URL (e.g., www.timewarnercable.com). In other embodiments, the service provider may be a conglomeration of multiple logical entities. Multiple logical entities may be useful to further distribute services over various network resources or enable additional features provided by partnered corporations or providers. Common examples of network resources include e.g., broadcast, multicast, video-on-demand, advertisement services, local services, etc. For example, one exemplary stream manifest file may include entries from: www.timewarnercable.com, vod.timewarner.com (video on demand services), www.nhk.jp ($3^{rd}$ party content), www.adserver.com ($3^{rd}$ party advertisement services), etc.

In another example, the media chunk listing may include a listing of URL links which is further punctuated with HTML tags or Javascript, which is configured to enable advertisement insertion and/or execution of complementary programming. For instance, the video client may substitute tailored locally stored advertisements for commercial breaks, rather than e.g., the default broadcasted commercial. In other embodiments, the video client may run a Javascript Applet that allows the subscriber to execute a command or otherwise provide feedback (e.g., to order pizza, vote on a reality show, etc.).

In the exemplary embodiment, each media chunk is an encoded (and optionally encrypted) subsection or segment of media content. The media chunks (decrypted if necessary), when decoded and played in the appropriate order, render the original media content. In one implementation, each media chunk represents a portion of video associated with a specific resolution, codec, and time stamp. The media chunks are assembled according to a time stamp sequence.

In another embodiment, however, non-time-based segments may be used in the manifest. For example, playback may occur according to the context of the sequence and not because of any implied meaning of the filename, or time stamp value. The true duration of a video segment is based on its contents and its presentation time stamp (PTS), which may not be represented in the manifest. The sequence of the next file in the manifest is simply what comes next. Specifically, any schema could be used for the TS files in the manifest, including 1.ts, 2.ts, 3.ts, etc . . . Or A.ts, B.ts, or C.ts.

It is appreciated that while the present disclosure has focused on media chunks that are video content, the various aspects described herein find wide ranging application to other types of content. Common examples include e.g., audio content, data and text content, Internet traffic, gaming traffic, etc.

In one implementation, the network stream manifest has a fixed number of content chunk entries which are sequentially ordered. For example, typical playlists consist of ten (10) six-second (6 s) chunks of video content, representing a minute of video. As each chunk is played, a replacement chunk is added (similar to a First-In-First-Out (FIFO) buffer). Other implementations may expand or contract or have non-sequential ordering according to e.g., various network considerations. For example, the network stream manifest may dynamically adjust length based on available servers, available bandwidth, etc. In other cases, the network stream manifest may have a first section (e.g., for program content), and a second lower priority section for background loading (e.g., for advertisements). For streams which support multiple different technologies and/or resolutions, the stream manifest may be "striped" or split into portions, each stripe or portion associated with a particular technology or resolution, etc.

In yet another embodiment, the device and/or a network entity may generate the manifest in real time; i.e., as the live content is displayed or rendered.

Referring back to FIG. 3, at step 304 of the method 300, the media client device receives one or more content chunks from the service provider, in accordance with a network stream manifest generated and stored at the network. The network stream manifest is used by the network to identify and deliver appropriate content chunks to a requesting device. In one embodiment, the one or more content chunks are streamed from a server at the MSO. In some variants, the streaming may comply with one or more Quality of Service (QoS) guarantees, or have a level of priority over other network traffic. In other embodiments, the one or more content chunks are downloaded in a background "best effort" process (i.e., the data is delivered without a guaranteed QoS level or priority).

In other so-called "optimized" embodiments, the media client device may identify one or more content chunks which can be ignored. In some cases, the identification may be based on device limitations, subscriber preferences, business practice, etc. For example, the media client device may only support one video resolution, one codec, etc. Hence, content chunks for other resolutions or codecs are not displayed and/or not stored (as will be discussed below). In other examples, the media client device may identify content which was previously stored (e.g., a commercial, etc.) and would be duplicated if stored again. In this instance, the device ignores or fails to display and/or store those chunks. In yet another example, the multiple audio encoding that typically is carried with the same video stream, e.g., AC3 and/or Dolby audio streams is separated into separate files. The client player may then only download the appropriate audio codec needed.

Certain business models/operational requirements may require that the service provider or MSO implement access restrictions to content. Accordingly, in some implementations, the network stream playlist is encrypted and/or has a limited distribution (i.e., is unicast to a specific subscriber or multicast to a group of subscribers, as opposed to broadcast). Encryption can be of a symmetric or asymmetric key nature. Symmetric key architectures use the same key for encryption and decryption; asymmetric key architectures (e.g., private/public keys) are different for encryption and decryption. Those of ordinary skill in the related arts, given the contents of the present disclosure, will readily appreciate that access restrictions may be used for purposes other than surreptitious access. For example, in some cases, access restrictions may ensure that certain types of content are not viewable on certain devices (so-called "viewer control chip (V-chip)" implementations). In other cases, a viewer may be required to use a password and/or affirmatively elect to access certain types of content (e.g., the content may be required to provide a click-through-to-continue access restriction, etc.).

Still other embodiments may modify playback; for example, a home version of content may be stripped of advertisements whereas the versions for portable playback on the subscriber's devices still require ad insertion. In another such example, a parent may effectively limit the usage of a device by restricting playback length (e.g., to enable parents to enforce "TV time" limits), or by restricting the number of playbacks. In some variants, the playback limitations can be tracked with a central monitor software, thereby preventing e.g., a child from avoiding playback restrictions by switching between different devices.

Other forms of access control include Digital Rights Management (DRM), conditional access (CA), trusted domain (TD), etc. One example of utilization of the foregoing technologies is described within co-owned, co-pending U.S. patent application Ser. No. 13/710,308 filed on Dec. 10, 2012 and entitled "APPARATUS AND METHODS FOR CONTENT TRANSFER PROTECTION", which is incorporated herein by reference in its entirety. As discussed therein content is delivered via a managed content distribution network (such as a cable or satellite or HFCu network having an MSO), and the MSO manages the rights and restrictions of the content outside of a premises, and in a data center or headend, by providing requested content to a gateway device within the premises.

The content is, in the exemplary embodiment, provided in a first encryption format and encoded using a first codec, both of which are compatible with the gateway device. In order to provide for a transfer of the content within and outside of the premises network, the gateway is configured to transcrypt the content into an encryption format, and transcode using a codec, that are each compatible with a device which requests the content therefrom. In one implementation, the content is received at the gateway as MPEG-2 content encrypted using Powerkey conditional access (CA) technology. The gateway uses its associated CableCard to decrypt the content, and a transcoder entity to transcode the content to e.g., MEPG-4 (or other appropriate format). The content is then re-encrypted to DRM using a content key obtained from a DRM server and a transcrypter of the gateway. This approach advantageously preserves content rights, and asserts restrictions on use or distribution of content, via the user's premises gateway.

The exemplary gateway apparatus then transmits the content to a requesting client device (e.g., CPE). The CPE must in the exemplary configuration use the same content key to decrypt the content as was used by the gateway when the content was transcrypted. Therefore, the gateway and devices in communication with the gateway (and which would presumably request content therefrom) are established to use the same DRM client.

In another embodiment, content is transferred from a DVR to other portable devices in communication therewith. The DVR receives content in a first format and encryption scheme, and transcodes and/or transcrypts the content to a format and scheme with which requesting devices are compatible. In one exemplary implementation, the requirement for transcryption is removed by using the same DRM algorithm to protect content on both the DVR and the requesting devices. In one variant, the DVR and the requesting devices each use the same DRM client to request a DRM license from a DRM server. Using the same algorithm for both client applications advantageously enables the MSO to control and change usage rights and restrictions at any time up through content playback, and regardless of any transfer of the content between devices (i.e., between the gateway and/or DVR and the requesting devices in communication therewith).

Co-owned, co-pending U.S. patent application Ser. No. 11/584,208 filed on Oct. 20, 2006 and entitled "DOWNLOADABLE SECURITY AND PROTECTION METHODS AND APPARATUS", now published as U.S. Patent Application Publication No. 2008/0098212, and commonly owned U.S. patent application Ser. No. 11/657,828 tiled on Jan. 24, 2007 and entitled "APPARATUS AND METHODS FOR PROVISIONING IN A DOWNLOAD-ENABLED SYSTEM", now published as U.S. Patent Application Publication No. 2008/0177998, are also incorporated herein by reference in their entirety, and describe further content protection apparatus and methods usable with the present disclosure.

Specifically, as discussed in the previously referenced U.S. patent application Ser. No. 11/584,208, a network architecture that provides for enhanced conditional access (CA), trusted domain (TD), and digital rights management (DRM) capabilities may be utilized. This network architecture comprises apparatus useful at, inter cilia, the head-end or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network.

In one embodiment, these enhanced capabilities comprise downloadable software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments of the present disclosure allow for the download of secure software images, which may be used to, inter alia, ensure security of the downloaded images and also migrate protected content to other platforms in the user or client domain so as to extend the "trusted domain".

Advantageously, this architecture provides for securing of the CA, TD, and DRM Client software as opposed to merely the delivered content. Specifically, outside of the conditional access system (CAS), the software of the present disclosure is never rendered in an unprotected form or otherwise made accessible. This is of particular significance from the standpoint that protection of the software is typically of much greater commercial interest and value to the network operator than the content itself. Stated differently, not only is the delivered content highly secure, but also the mechanisms used to control and access the content within the user domain.

Still further, the apparatus and methods discussed in co-owned and co-pending U.S. patent application Ser. No. 13/721,154, filed on Dec. 20, 2012 and entitled "SYSTEM AND METHOD FOR MANAGING ENTITLEMENTS TO DATA OVER A NETWORK", which is incorporated by reference in its entirety, may be utilized to e.g., determine whether a subscriber is entitled to access content via an IP network. In one embodiment, the determination is based on the subscriber's entitlement to receive the same content, related content or other content from a multi-channel video programming distributor without disclosing proprietary subscriber information. As further discussed therein, a subscriber or user device operated by a subscriber generates a request for access to a requested content residing on a content access provider server. The subscriber has an account with a multi-channel video program distributor (MVPD) and the account comprises subscription information indicative of the services provided by the MVPD to the subscriber. The content request is received by the content access provider and forwarded to an entitlements server. The entitlements server determines whether the subscriber is entitled to receive the requested content based on the subscription information, and sends an access granted message to the content access provider server when the subscriber is entitled to receive the requested content.

Common examples of restrictions include restrictions based on: subscriber account considerations, programming considerations, device limitations, and temporal and/or geographic limitations. For example, in one such implementation, the video client verifies that a subscriber is allowed to record the content (based on their subscriber account permissions) before allowing access to the video content for local storage on the portable device.

In some cases, the media client may prioritize content chunk download according to e.g., network traffic, bandwidth limitations, and/or content type. For example, where download speeds are particularly bad, the media client may focus on downloading content chunks (rather than advertising chunks or other content chunks). During playback, the ignored commercials can be replaced with previously stored commercials, thereby ensuring that customer experience remains high. In very extreme cases, the media client may even throttle down to lower resolution chunks (which are smaller, and thus require less time to download).

The media client device stores each content chunk in a local memory (step 306 of the method 300). In one embodiment, the storage in local memory is relatively short term, with chucks being removed and replaced with newer chunks as the content is displayed and permanent storage occurring at e.g., a network entity. For example, a network level personal content server such as that disclosed in co-owned, co-pending U.S. patent application Ser. No. 13/888,224 filed on May 6, 2013 and entitled "PERSONAL CONTENT SERVER APPARATUS AND METHODS", which is incorporated herein by reference in its entirety, may be utilized. As discussed therein, a personal content server located, e.g., at the head-end of the bearer network is disclosed; this server distributes content to the remote requesting location(s), thereby eliminating repetitious traffic to and from subscriber's premises to fulfill the requests for remote content delivery. In one variant, information relating to the requesting subscriber's prior activity for the requested content is used as a basis for authorizing delivery of the remote content. For example, a remote content manager may determine whether the requested program was previously stored on the subscriber's DVR attached to the local network; such as in the aforementioned temporary storage or in a permanent storage associated with the requesting client device. This information is gathered by either querying the DVR or by querying a process at the head-end for the program titles stored on the DVR.

In another variant, when the subscriber wishing to access content (e.g., watch a program) from a location outside the bearer network does not have a DVR on his premises, the personal media management server communicates with either a "network DVR" or a "virtual DVR" maintained for the subscriber at the head-end or other location outside of the subscriber premises in order to determine remote access privileges.

At step 308 of the method 300, the media client device generates a local stream manifest, the local stream manifest identifies the location (in local memory or at a network server) of each content chunk. Those of ordinary skill, given the contents of the present disclosure, will readily appreciate that a variety of memory architectures are possible, given the desired device functionality. For example, in some embodiments, the media client device renders the content from a network buffer or server. Accordingly, the manifest identifies a location at the network where the content may be accessed. In other embodiments the media client device stores the content to local memory and renders the content from the local memory (step 310).

In another embodiment, the media client manages multiple different memory technologies and storage locations based on intended use. Common memory technologies include e.g., hard disk drives (HDD) which offer long term storage, and volatile memory (random access memory (RAM), FLASH, etc.) for short term storage and fast access. For example, a small portable media device may store the chunks entirely within RAM, whereas a desktop server may store the chunks in a redundant array of inexpensive disks (RAID) array.

Similar to the network stream manifest, the local stream manifest includes metadata and a listing of media chunk entries. The local stream manifest may incorporate URL, path, or symbolic entries, or any combination of the foregoing, as discussed above. For embodiments which retain the chunks in a protected format (e.g., the chunks remain encrypted or otherwise obfuscated for storage), the local stream manifest may include access information (encryption keys, entitlement restrictions, etc.).

The local content manifest is sequentially ordered and organized according to content. For example, a typical playlist is associated with a subscriber generated content descriptor and/or a default content descriptor. Common examples of subscriber generated content descriptors include e.g., titles (e.g., "Super Bowl 2014"), tags (e.g., "football", "2014", "Seahawks", "Broncos", etc.), etc. Common examples of default content descriptors include e.g., titles, tags, recording information (e.g., "Channel 12", "8:30:00-9:00:00", etc.), such as that supplied by a content source, and/or crowd sourced references ("#SuperBowl"), etc.

Figure 4:
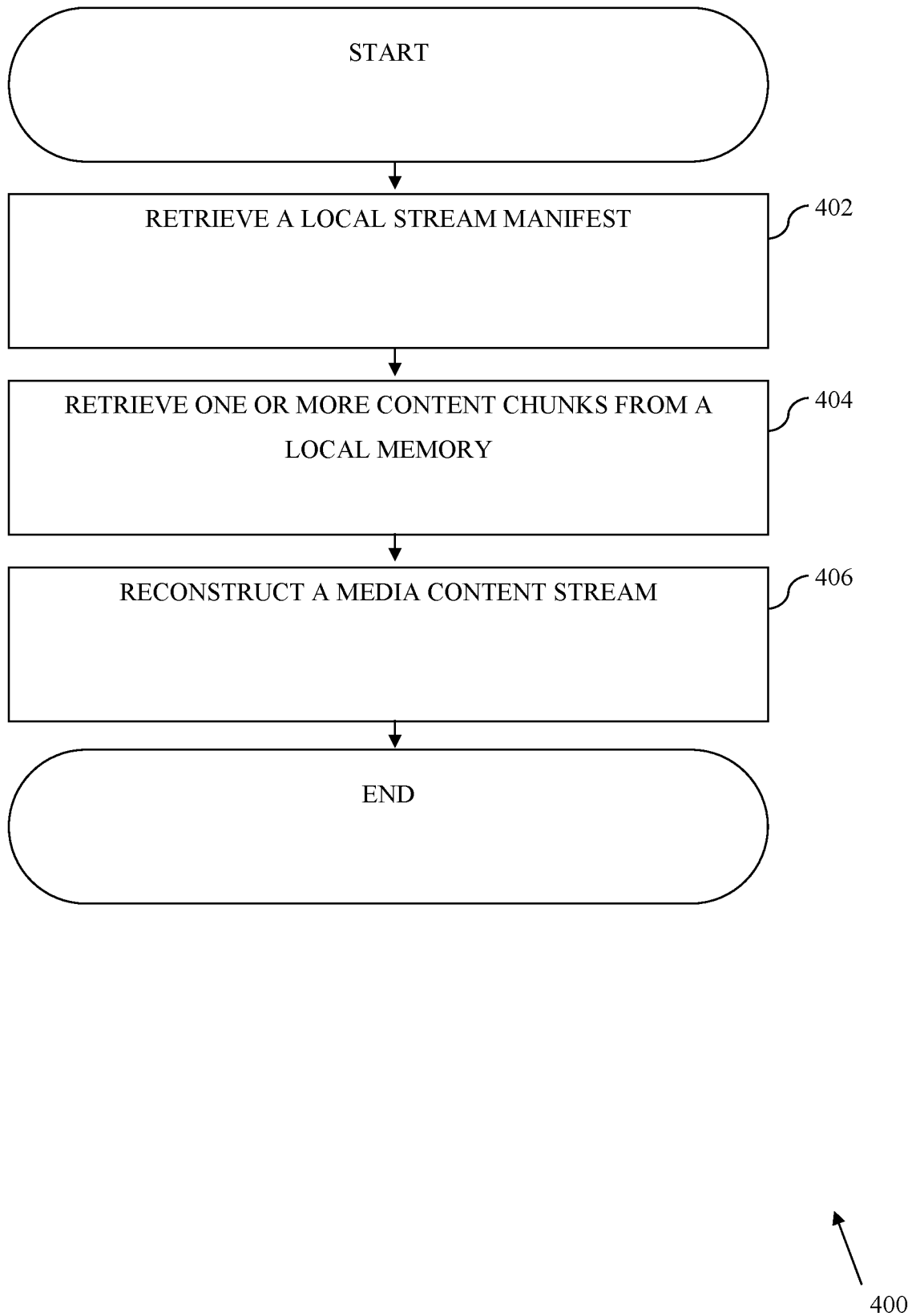
FIG. 4 is a logical flow diagram representing one embodiment of a method for playing back streaming media content from a stream manifest.

Once the local content manifest has been generated (as discussed above), it may be utilized to reconstruct the media content. FIG. 4 illustrates one embodiment of a method 400 for reconstructing media content in a local device with a stream manifest file.

At step 402 of the method 400, the media client device retrieves a local stream manifest from local storage. In one embodiment, the media client device provides a graphical user interface (GUI), enabling the subscriber to select media content based on a subscriber-generated content descriptor and/or a default content descriptor. For example, in one case the subscriber provides a previous title (e.g., "Super Bowl 2014"); the corresponding playlist is identified and retrieved.

In another example, the subscriber may perform a search (e.g., for "football"), a listing of playlists which correspond to the search term are displayed. The subscriber can select from the displayed list of playlists and the stream manifest for the selected playlist is retrieved.

In another embodiment, the media client device automatically selects content based on pre-defined selection criteria. For example, the media client device may record a number of programs according to a pre-arranged schedule (e.g., the subscriber's favorite shows), and when the subscriber is ready to view the content, the media client device cycles through the recorded programs without requiring further user input. For example, the methods and apparatus disclosed in co-owned, co-pending U.S. patent application Ser. No. 12/414,554 filed on Mar. 30, 2009 and entitled "PERSONAL MEDIA CHANNEL APPARATUS AND METHODS", which is incorporated herein by reference in its entirety, may be utilized. According to this variant, "fused" targeted content delivery is provided. Specifically, a substantially user-friendly mechanism for viewing content compiled from various sources, including, inter cilia, DVR, broadcast, VOD, Start Over, etc., and particularly that content selected to align with a user's preferences, is displayed as a substantially continuous stream as part of a "virtual" user-based channel.

In one embodiment, a user profile is constructed and targeted content gathered without requiring any user intervention whatsoever; e.g., based on a user's past or contemporaneous interactions with respect to particular types of content, as discussed in co-owned, co-pending U.S. patent application Ser. No. 12/414,576 filed on Mar. 30, 2009 and entitled "RECOMMENDATION ENGINE APPARATUS AND METHODS", which is also incorporated herein by reference in its entirety.

The "virtual channel" acts as a centralized interface for the user and their content selections and preferences, as if the content relevant to a given user were in fact streamed over one program channel. In another aspect, the compiled content is presented to the user in the form of a "playlist" from which a user may select desired content for viewing. In one variant, a user is also presented with content having varying degrees or aspects of similarity to that presented in the "playlist" or elsewhere, which is selected using e.g., the previously referenced recommendation engine.

In yet another aspect of the disclosure, an improved electronic program guide (EPG) is provided. The EPG gives a user the ability to view broadcast content across a broad timeline (i.e., content previously aired, as well as that which is currently airing and that which will air in the future). The EPG may incorporate various functions including allowing a user to start over, record, watch, receive more information about, catch up with, and rate the content of interest. The EPG also includes a function wherein a user may view an entire day's programming from one or more program channels. The user may also pull up recommended content from the EPG and can, in one embodiment, view a customized EPG showing a schedule solely comprised of recommended content.

In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing.

In a further example, when the media client device has poor reception, the device may fetch advertising from local memory while filling its buffer of currently playing network programming (which may or may not be recorded and stored at the device and/or network); in other words, the device or network may pre-store advertisements to "stall" for more time.

The network server can also instantiate a trusted domain within a premises if one does not already exist in order to secure the transfer of content to devices within the premises as well as between these devices (as discussed elsewhere herein). For example, using a downloadable CA (DCAS) approach, the necessary software and firmware, if any, can be downloaded, thereby enabling designation of the requesting device as within a trusted domain for handling content. Exemplary trusted domain apparatus and methods are described in co-owned and co-pending U.S. patent application Ser. No. 13/674,866 filed on Nov. 12, 2012 and entitled "TECHNIQUE FOR SECURELY COMMUNICATING AND STORING PROGRAMMING MATERIAL IN A TRUSTED DOMAIN", incorporated herein by reference in its entirety, although it will be recognized that other approaches may be used.

In one embodiment, an authorized service domain (ASD) approach is utilized for protecting content delivered to the client devices. The exemplary configuration of the ASD comprises a UPnP digital rights management technology that is used by the network operator to protect content using security credentials of a multi-stream cable card or secure microprocessor disposed on the requesting device. An exemplary ASD service (ASDService) defines a service that runs on the content server and is invoked by the device. The ASDService process is defined for exchanging and authenticating security credentials to the requesting device and any connected devices within the ASD.

The exemplary ASDService, in one embodiment, abides by the UPnP AV Architecture for browsing content, setting up connections, transporting content and finally controlling the flow of the content between devices, although this is by no means a requirement for practicing the present disclosure. The ASDService is a precursor to the UPnP general playback process, and is executed before the requesting device can browse a content directory (e.g., maintained by the content server) or allow playback.

In some embodiments, the client device verifies to the network that the subscriber is appropriately authenticated and/or authorized to view the selected content. As previously noted, one exemplary mechanism for doing so is described within the co-owned and co-pending U.S. patent application Ser. No. 13/721,154, filed on Dec. 20, 2012 and entitled "SYSTEM AND METHOD FOR MANAGING ENTITLEMENTS TO DATA OVER A NETWORK", previously incorporated by reference in its entirety. Common examples of restrictions include restrictions based on: subscriber account considerations (e.g., trial account, premium account, etc.), subscriber age permissions (e.g., R-rated, PG-rated, G-rated, etc.), programming considerations, device limitations, temporal and/or geographic limitations, etc. For example, in one such implementation, the video client verifies that a subscriber is allowed to playback the content (based on their subscriber account permissions) before retrieving the media.

At step 404 of the method 400, the media client device retrieves one or more content chunks from a local memory, in accordance with the local stream manifest. Alternatively, the content may be stored separate from the client device, such as at a network entity or edge server.

In some cases, the local stream manifests may be incomplete. For example, a home server may store multiple versions of video content which are optimized or limited for e.g., various device resolutions, codec capabilities, etc. Under certain implementations, the media client device may select the appropriate one of various manifest entries for an appropriate version based on header information contained in the manifest entry. Where there is no suitable version of the requested content listed in the local manifest, the version is incomplete, or the version is not optimal, the media client device may identify the issue to the subscriber and/or automatically download the necessary content from the service provider. In some cases, the service provider may have pre-loaded or pre-configured manifest files (e.g., similar to Video-on-Demand (VOD) type services).

In some implementations (such as e.g., for certain legacy paradigms), the service provider may provide the bulk file download (i.e., enable the client device to download the entire content), and thereafter the client device can partition the file into media chunks for playback and/or storage either at the device or at a network or edge entity. In addition, the network or the client device of the legacy implementation may create the manifest file.

At step 406 of the method 400, the media client device reconstructs a media content stream based at least in part on the retrieved one or more content chunks. In some eases, reconstruction may further include decrypting the media content stream with a key. The key may be specific to e.g., the content, the device, the subscriber, etc. An exemplary method for providing a secure content key exchange between the network and one or more client devices is given in co-owned, co-pending U.S. patent application Ser. No. 13/608,969 filed on Sep. 10, 2012 and entitled "TECHNIQUE FOR SECURELY COMMUNICATING AND STORING PROGRAMMING MATERIAL IN A TRUSTED DOMAIN", which is incorporated herein by reference in its entirety. As discussed therein, a trusted domain is established within which content received from a communications network, e.g., a cable TV network, is protected from unauthorized copying. In one embodiment, the trusted domain includes a device associated with a user which receives content from the cable TV network. The content may be encrypted using a content key in accordance, e.g., with a 3DES encryption algorithm before it is stored in the device. In addition, a first encrypted content key version and a second encrypted content key version are generated by respectively encrypting the content key with a public key associated with the device and another public key associated with the user, in accordance with public key cryptography. The first and second encrypted content key versions are stored in association with the encrypted content in the device storage. The encrypted content can then be migrated from a first device to a second device also associated to the same subscriber. The second device is then able to decrypt the content using the second encrypted content key version.

In some cases, the media client device may identify one or more content chunks which can be ignored (i.e., which will not be displayed). The identification may be based on device limitations, subscriber preferences, business practice, etc. In one example, when a customer has purchased content, the media client device may be provided with an ability to skip commercial breaks, provide content at a higher quality or resolution, etc.

Consumer Premise Equipment

Figure 5:
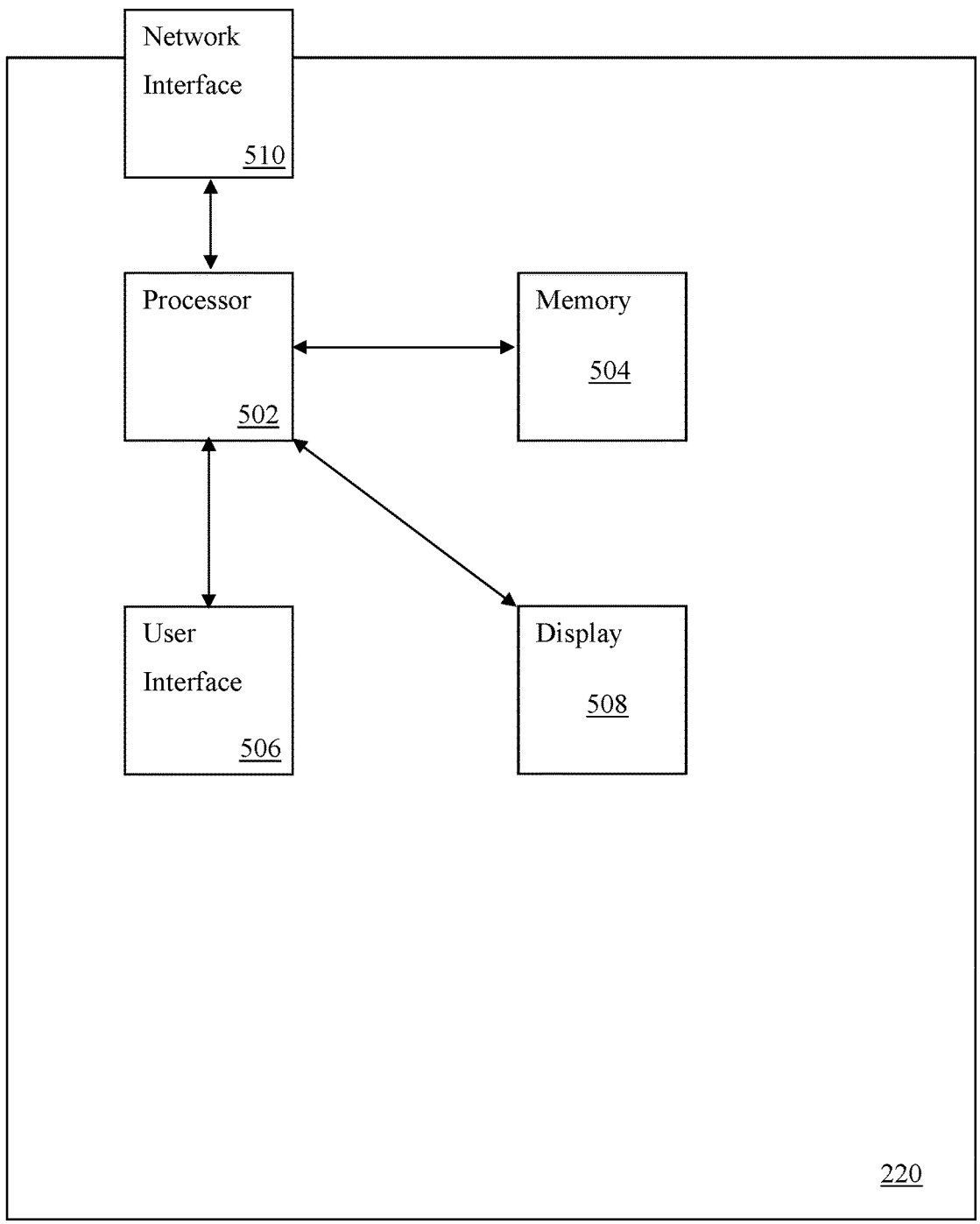
FIG. 5 is a logical block diagram representation of one exemplary embodiment of the consumer premise equipment (CPE) configured in accordance with the present disclosure.

Referring now to FIG. 5, one exemplary embodiment of the consumer premise equipment 220 (CPE) configured in accordance with the present disclosure is described in detail. A CPE 220 in the context of the present disclosure generally includes a computerized device running an operating system. The CPE 220 includes a processor subsystem 502, memory subsystem 504, user interface 506, display 508, and one or more network interfaces 510

The CPE 220 may comprise for instance any device capable of requesting, receiving, and/or decoding content, whether for display thereon, or for recording, display, or storage on a device in communication therewith. Exemplary devices include set top boxes, television sets, laptop and desktop computers, smart phones, personal media devices (PMD), tablets, netbooks, etc. The CPE 220 may, in one embodiment, be registered to a single physical location (such as a subscriber premises), and make use of a digital rights management (DRM) content protection scheme to comply with limitations on certain content, or provide authorization credentials with respect to protected content.

The memory system 504 includes one or more non-transitory computer readable media configured to store one or more computer readable instructions and media content. Common examples of memory systems include without limitation: hard disk drives (HDD), solid state drives (SSDs), random access memory (RAM), dynamic RAM (DRAM), synchronous RAM (SRAM), FLASH, electronically erasable programmable read only memory (EEPROM), etc.

The processor 502 of the exemplary CPE 220 is configured execute one or more computer programs stored within the memory system 504. At least a portion of the one or more computer programs are configured to implement the above-disclosed functionalities as discussed above with respect to FIGS. 3-4. It is further appreciated that the computer programs which enable the aforementioned functionality may be pre-installed on the apparatus, or may be downloaded from a network or the service provider.

In one exemplary embodiment, during recording operation, the processor 502 executes one or more computer programs configured to cause the CPE 220 to receive a network stream manifest from a service provider, receive one or more content chunks from the service provider in accordance with the network stream manifest, and for each content chunk, store the content chunk in the memory system 504. Additionally, the processor executes one or more computer programs configured to cause the CPE 220 to generate a local stream manifest that identifies the location (in the memory system 504) of each content chunk.

During playback operation, the processor 502 executes one or more computer programs configured to cause the CPE 220 to retrieve a local stream manifest, retrieve one or more content chunks from a local memory, in accordance with the local stream manifest, and reconstruct a media content stream based at least in part on the retrieved one or more content chunks. The reconstructed media content stream is played back e.g., via the display device 508 of the CPE or other rendering apparatus.

The user interface 506 of the CPE 220 is configured to accept user input. Most user interfaces 506 are further coupled with a graphical user interface (GUI) program which provides visual feedback via the display 508. Common examples of user interface components include without limitation: mouse, keyboard, touchscreen, remote control, push buttons, etc. Complex implementations may further incorporate e.g., gestures, voice control, etc.

The display 508 refers to any visual display technology as embodied within e.g., a screen, a monitor, projection/projector, or other audio/visual (A/V) panel. Common examples of display technologies include e.g., light emitting diode (LED), liquid crystal display (LCD), plasma, cathode ray tube (CRT), digital light processing (DLP), organic LED (OLED), field emission display (FED), laser phosphor display (LPD), etc. Moreover, display 508 may incorporate additional features including e.g., stereoscopic technologies, holographic technologies, etc. Although not specifically illustrated, the display apparatus may further comprise a mechanism for rendering audio portions of content as well.

The one or more network interfaces 510 are configured to enable network connectivity to other devices. In one exemplary embodiment, the network interface includes a coaxial cable input (e.g., for connection to a cable provider's CDN). Other examples of network interfaces include wired and wireless technologies, such as e.g.,: RJ-45 LAN connector with Ethernet LAN card, USB ports, IEEE-1394 "Firewire" interface, wireless interface (such as 802.11 LAN card, WiMAX 802.16 interface, 802.15 PAN interface, Bluetooth interface), Zigbee, or Z-wave and so forth.

Example Operation

Figure 6:
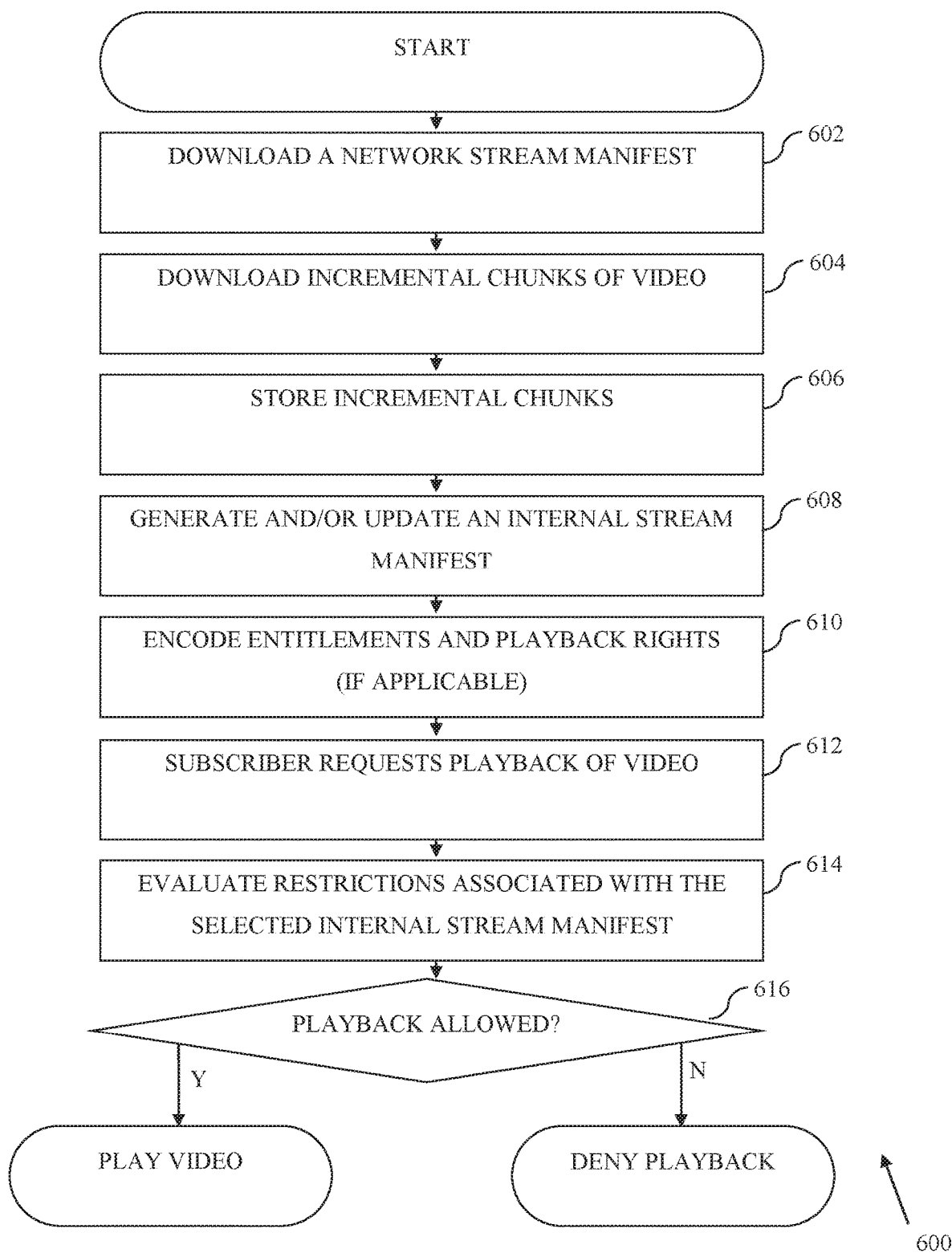
FIG. 6 is a logical flow diagram representing one exemplary method for recording streaming video content with a stream manifest file, and subsequent video content playback from the stream manifest file, in accordance with the principles described herein.

FIG. 6 depicts one embodiment of an exemplary method 600 for recording streaming video content with a stream manifest file, and subsequent video content playback using the stream manifest file.

At step 602 of the method 600, a portable device downloads a network stream manifest. In the exemplary portable device, the download occurs in a background process. During viewing, the network stream manifest may be refreshed periodically (such as once every 30 seconds) for the duration of a program. In some cases, the download of the network manifest may be triggered by an event (e.g., a subscriber changing programming selection, network "pushed" updates, a conditional event (such as a timer expiration), etc.

APPENDIX A hereto is one exemplary network stream manifest (also referred to as an "elementary playlist") representing HTTP Live Streaming (HLS) content delivered from a CDN network. As shown, the network stream manifest contains header information and a sequential listing of the full Internet Protocol (IP) path of the video chunks. The header information includes e.g., version information, duration, starting sequence number, etc. Those of ordinary skill in the related art, given the contents of the present disclosure, will readily appreciate that the header information may identify a myriad of useful information e.g., content descriptors, encryption keys, codec, resolution, entitlements, etc. In one exemplary embodiment, the identified encryption keys may comprise encryption key "references" and not the actual keys to decrypt the content. In other words, the manifest signals when the content encryption changes, which then triggers the client player to request this key value from the network, e.g., the DRM.

As shown, the network stream manifest includes ten (10) path entries; each path entry identifies the appropriate IP path for a corresponding chunk with a six (6) second chunk of video content. For example, the chunk that is to be played at time stamp 99647 can be found at: http://www.timewarnercable.com/video/channel1/20130320T200040-04-99647.ts. However, as noted previously, the name of the file is merely a convention that may use a time stamp to keep that file from colliding with other file names. The value may have no meaning to the client playback in one embodiment. The alignment of one bitrate manifest may for example be by the MEDIA-SEQUENCE identifier and the sequential relationship of like files in those manifests. In other words, the names do not necessarily have to align.

It will be appreciated that other implementations may vary in e.g., length of the manifest, run time of the chunks, ordering of the chunks, etc. For instance, chunks may be ordered in a non-sequential manner so as to enable different resolutions (multiple chunks of different resolutions associated with the same time stamp), background downloads (e.g., chunks for advertisement or other optional content may be interspersed, etc.). In other implementations, chunks may be oddly sized (e.g., six (6) second, twelve (12) second, eighteen (18) second, etc.), or the manifest itself may vary in length (greater or fewer than ten (10) entries), etc.

APPENDIX B is the same exemplary network stream manifest thirty (30) seconds later. As shown, the first five (5) entries (time stamps 99647-99651) have been played, and five (5) new entries (time stamps 99657-99661) have been added. In this implementation, the network stream manifest operates similarly to a First-In-First-Out (FIFO) buffer of length ten (10).

Responsive to an instruction to record, the portable device downloads one or more incremental chunks of a live video stream according to the network stream manifest (step 604), and stores them locally in the device storage (step 606).

The portable device generates and/or updates an internal stream manifest (step 608) which identifies the local storage path associated with each of the incremental chunks. APPENDIX C is one exemplary local stream manifest for time stamps 99647-99656. For example, the chunk that is to be played at time stamp 99647 can be found at: videorecording1/channel1/20130320T200040-04-99647.ts.

APPENDIX D is the same exemplary local stream manifest thirty (30) seconds later. As shown, the internal stream manifest for the program must track the entirety of the recorded content, and thus accumulates path entries over the duration of recording.

At step 610 of the method 600, applicable entitlements and playback rights are encoded for later use according to a client-based Digital Rights Management (DRM) process executed on the portable device. In one such implementation, the internal stream manifest is encrypted and encoded with entitlement and digital rights management information, including but not limited to: time before deletion, number of entitled playbacks, valid geographical locations for playback, etc. In some instances, the subscriber may be further prompted to add subscriber generated content descriptor for the internal stream manifest e.g., "Super Bowl", "Channel 1, recorded Aug. 8, 2010, 8:00 PM", etc.

Subsequently thereafter, when the subscriber, requests playback of the video content (e.g., via graphical user interface (GUI) selection), the appropriate internal stream manifest is retrieved (step 612).

At step 614 of the method 600, any applicable entitlement restrictions associated with the selected internal stream manifest are evaluated to determine whether playback is allowed. Entitlement restrictions are described in detail within co-owned and co-pending U.S. patent application Ser. No. 13/721,154, filed on Dec. 20, 2012 and entitled "SYSTEM AND METHOD FOR MANAGING ENTITLEMENTS TO DATA OVER A NETWORK", previously incorporated by reference in its entirety. In one such implementation, the portable device verifies that a subscriber is allowed to view the content (based on their subscriber account permissions) before allowing the media player access to the video content for playback locally on the portable device. Additional safeguards such as maximum life of local storage and periodic network access requirements (e.g., to "refresh" content permissions) may be imposed to verify device entitlement of the video content.

At step 616 of the method 600, if playback is allowed, then the portable device decompresses, decodes, and displays the content associated with each chunk of the content, as specified by the internal stream manifest. Otherwise, where playback is not allowed, the portable device denies the request, possibly with an error message (e.g., "the requested content is restricted", "the requested content must be purchased", etc.).

The following discussions present several salient variants which further enhance, optimize, or modify the disclosed methods and apparatus, according to a variety of operational or business models. Still other variants will be readily appreciated by artisans of ordinary skill in the related arts, given the contents of the present disclosure.

Video Resolution Enhancement and Optimization

In some variants, the entries of the local stream manifest (and associated chunks) support a range of different video resolutions. Such an embodiment may be particularly useful for a home server which may support playback over a number of different consumer devices (e.g., a subscriber's tablet, smart phone and High Definition Television (HD TV)). APPENDIX E illustrates one such exemplary "multi-resolution playlist". As shown, the internal stream manifest includes a header which, in the illustrated embodiment, identifies three (3) distinct supported resolutions: 640×480, 720×480, and 1920×1080. Other peripheral information is included (e.g., necessary bandwidth, supported codecs, etc.). Each entry consists of three (3) elementary streams corresponding to the appropriate resolution size to be played at a time stamp as referenced by their elementary stream manifest. During replay, the entity functioning as a local content server identifies the appropriate chunk associated with the desired playback resolution as referenced by its elementary stream manifest and provides the chunk to the requesting video client.

In another variant, the entries of the internal or local stream manifest (and associated chunks) are further optimized or abbreviated for offline access by a specified device having a specified resolution. Since the portable device will not access the video content from the home server or service provider (in real-time), the video client can detect the portable device type and rewrite the variant playlist to restrict the elementary stream for just the profiles that matches the desired quality and viewer experience that is supported by the portable device. Optimization prevents pixilated low quality videos or sluggish decode and down-sampling of an over-coded video. APPENDIX F illustrates one such internal stream manifest which has been optimized for an HD TV. The pruned entries are noted with strike outs.

DRM rules for what can be played on-net versus off-net is another example of how these rules may be utilized.

As shown, for HLS, the "main" manifest references multiple "elementary" manifest by URL. In APPENDIX E, the shaded section, represents a "main" manifest of a video stream. It references multiple "elementary" manifest "files" as "01.m3u8", "02.m3u8" and "03.m3u8", all by relative path to where the main manifest is located (.i.e: in the same directory of the "main" manifest URL). One may compare the manifest of APPENDIX E with that of APPENDIX A, which is an example of an "elementary" manifest and only contains contents (reference video chunks) that are valid for the resolution, bandwidth, encoding, etc. that is referenced for it in the "main" manifest. Elimination of a reference to the elementary stream in APPENDIX F, eliminates the elementary stream "chunks" from being downloaded to the device.

Dynamic Advertisement Insertion and Tracking During Playback

As previously alluded to, one significant stream of revenue for service providers is that of advertisement views. More directly, commercial advertisers are willing to pay a price premium if a service provider can guarantee and/or verify a pre-determined number for views their advertisement will receive. Thus, in some business models, there may be commercial incentives for dynamic advertisement insertion and/or advertisement tracking.

In one exemplary embodiment, the video client detects advertisement insertion points within a live video feed and modifies them on the fly when they are stored locally. In some cases, this can be done by inserting tags or identifiable links in the playlist file for advertisement placement during encoding of the live stream.

In one embodiment, methods and apparatus for identifying, creating and distributing audience or viewer qualities to an advertisement management system and/or an advertisement decision maker such as those discussed in co-owned, co-pending U.S. patent application Ser. No. 12/503,749 filed on Jul. 15, 2009 and entitled "METHODS AND APPARATUS FOR EVALUATING AN AUDIENCE IN A CONTENT-BASED NETWORK", which is incorporated herein by reference in its entirety, may be utilized. As discussed therein, viewership data is provided in real-time (or near-real time), and audience activities regarding, inter alia, broadcast, VOD, and DVR content are monitored. In one variant, a content provider may create more targeted advertising campaigns through use of an algorithm that combines advertising placement opportunities with audience qualifiers (i.e., psychographic, geographic, demographic, characteristic, etc. classifications) to create an advertising "inventory" that can be more readily monetized. In different variants, the inventory can be based on historical and/or "real time" data, such that adverting placements can be conducted dynamically based on prevailing audience characteristics or constituency at that time.

Identification and insertion of content targeted to a particular audience within a content-based network, such as a cable television or satellite network, may be accomplished via the apparatus and methods disclosed in co-owned, co-pending U.S. patent application Ser. No. 12/503,710 on Jul. 15, 2009 and entitled "METHODS AND APPARATUS FOR TARGETED SECONDARY CONTENT INSERTION", which is incorporated herein by reference in its entirety. As discussed therein, content is identified by analyzing audience or viewer qualities (i.e., psychographic, geographic, or demographic, characteristic or classifications) at a particular insertion opportunity using an advertisement management system (and associated advertisement decision maker process). The advertisement management system then, in one embodiment, uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program where an impending placement opportunity will occur) to a set of audience qualifiers of a target audience of an advertisement. The placement opportunity can then be optimized for one or more variables (e.g., proximity, revenue, impressions, etc.) by selecting the best fitting advertisement for that opportunity.

Referring now to APPENDIX G, one abbreviated exemplary network stream manifest describing content delivered from a CDN network is shown. As shown, at time stamp 99649, a commercial advertisement for snacks has been inserted, and is serviced from www.adserver.com. While the presented example is implemented with a manifest entry, it is readily appreciated that other indicia may be interchanged (e.g., via metadata, etc.) the foregoing example being merely illustrative.

During recording, the video client identifies the commercial advertisement and (if the advertisement should be stored) stores the advertisement in a separate location e.g., a memory location dedicated for commercials. In some eases, the video client may simply ignore the advertisement and substitute other advertisements. For example, as shown in APPENDIX H, the local manifest has replaced the commercial advertisement for snacks with a commercial advertisement for beverages. Time stamps for inserted commercials may be out of sequence, and do not affect the time stamps of the video content.

APPENDIX G and H illustrate exemplary advertisement insertion implementations. Although APPENDIX H illustrates a longer advertisement to be inserted as two "chunks" of 6 seconds each, it is appreciated that actual advertisements may be of various lengths (the foregoing being merely exemplary).

As a brief aside, advertisement "localization" is one business application of which remains ripe for exploitation. Localization refers to controlling advertisement viewership such that (i) the advertisement is viewed by the appropriate subset of subscribers to whom the advertisement is targeted, and that (ii) uninterested subscribers are shown replacement advertisements which are more likely to entice their interest. In most IPTV deployments such as one implemented over a cable data network, the subscriber accounts associated with video clients are known at the network-side servers. These subscriber accounts may be further associated with various demographics of interest (e.g., geography, commercial interests, age groups, etc.).

Accordingly, in some embodiments, the video client may additionally include an advertisement decision module which: (i) dynamically selects advertisements from locally stored video advertisement clips tailored for the viewer, (ii) tracks advertisement viewing, and possibly (iii) reports advertisement viewing metrics to the service provider. For devices which can possibly track advertisement success (e.g., a subscriber "clicks through" a displayed advertisement), success metrics may also be reported. Advertisement metrics for the population of subscriber devices can have significant impact on contract negotiations (the service provider can easily justify price premiums for known viewership). Moreover, as previously noted, traditional recorded advertisement viewing cannot not be tracked or changed with prior art solutions. The present disclosure advantageously provides a clear means to account for individual views of each advertisement (i.e., the video client can tally each time an advertisement chunk is played). For example, the apparatus and methods of co-owned, co-pending U.S. patent application Ser. No. 12/877,062 filed on Sep. 7, 2010 and entitled "METHODS AND APPARATUS FOR AUDIENCE DATA COLLECTION AND ANALYSIS IN A CONTENT DELIVERY NETWORK", which is incorporated herein by reference in its entirety, may be utilized to collect audience data. As discussed therein, audience data is collected from various data sources, such as inter alia, a device/user data source, an switched digital video (SDV) data source, a subscriber data source, a video on-demand (VOD) data source, an application server (AS) data source, an advertisement data source, and an electronic program guide (EPG) data source. Information may also be collected from the use of interactive applications (e.g., "iTV" or similar interactive applications). Collected data is then transmitted to a data collection system, where the records are collected, processed and used to generate files for delivery to a subscriber data analysis (SDA) system, the delivered data is then used for detailed analysis of user preferences, activity, and/or behavior. Reports relating to particular viewership for specific programs as well as for genre, time of day, day of week, etc. may be generated and used for deriving revenue by the MSO.

In another variant, the methods and apparatus of co-owned, co-pending U.S. Patent Application Serial No. 13/936,055 filed on Jul. 5, 2013 "APPARATUS AND METHODS FOR DATA COLLECTION AND VALIDATION INCLUDING ERROR CORRECTION IN A CONTENT DELIVERY NETWORK", which is published as U.S. Patent Application Publication No. 2013/0298149, and which is incorporated herein by reference in its entirety, may also be utilized. As discussed therein, audience information is obtained directly from customer's premises equipment (i.e., set top boxes, cable modems, PCs, PMDs, IP devices, etc.), for each individual device, or even on a per-user basis where possible, thereby allowing a content provider or other analytical entity to gather specific information in large quantities across a broad geographical area, or demographic/psychographic slice. Advantageously, multiple sources of content to which viewership behavior relates can be simultaneously monitored, and subscriber anonymity or privacy maintained (i.e., no use is made of personally identifiable information).

In one embodiment, statistical methods (e.g., linear regression, log linear regression) are used to arrive at an expected value for one or more of the various fields and records of the collected data. Accordingly, it may be detected when received data contains errors. Specifically, collected data is compared to the derived (e.g., average) or expected value, and if the data meets one or more prescribed criteria (e.g., is a given number of standard deviations away from the expected value or more) indicating that the data quality may be unacceptable, an error message is generated and the data optionally excluded. Hence, the foregoing features enable monitoring of an entire system proactively using a statistical or other method to alert the network operator only in the instance erroneous data meeting the test(s) of significance is received. In addition, a large volume of data (in a comparatively contracted period of time) may be assessed without requiring manual monitoring and/or error correction.

The foregoing mechanisms may be further utilized for data collection, validation, and analysis across multiple platforms. That is, data regarding a users interaction with content may be collected and utilized regardless of the device on which the content is received or requested, the source of the content, the type of content (e.g., linear, VOD, DVR, highspeed data, etc.), etc. While the exemplary systems and methods operate utilizing two-way capable user devices such as those used in cable or fiber optic (FTTC, FTTH, etc.) networks, non-two way capable devices (such as for example are used in some satellite-based implementations) can leverage various backhauls (e.g., broadband, DSL/dial-up or "over the top" backhaul) from the target premises to transmit tuning or other useful information to a third party (e.g., third party website). The third party collects the data and sends the data back to the satellite MSO (or caches the data first, and sends it up to the MSO at a later time). Pre-processing or "enrichment" of the data may also be conducted by the third party if desired.

Additionally, latency associated with the data collection may be accounted for via the methods and apparatus disclosed in co-owned, co-pending U.S. patent application Ser. No. 12/944,648 filed on Nov. 11, 2010 and entitled "APPARATUS AND METHODS FOR IDENTIFYING AND CHARACTERIZING LATENCY IN A CONTENT DELIVERY NETWORK", which is incorporated herein by reference in its entirety.

In some variants, the advertisement decision module may additionally receive/download different advertisements, updated business rules, etc. from the service provider. These targeted advertisements may be selected according to the appropriate subscriber account based on e.g., geography, social network (e.g., friends and family), employment, interest, and/or other demographics. In some cases, these downloads can be performed as a background process so as not to interfere with customer service and experience.

It is further appreciated that under certain revenue models, a customer could watch network streamed content and purchase the content outright. Once purchased, the local manifest is stripped of advertisement breaks in whole or part (or during playback, the advertisement breaks may be automatically skipped).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

APPENDIX A

© Copyright 2014 Time Warner Cable Enterprises LLC All rights reserved

```
#EXTM3U
EXT-X-VERSION:3
EXT-X-TARGETDURATION:7
EXT-X-MEDIA-SEQUENCE:99647
EXTINF:6.006,
http://www.timewarnercable.com/video/channel1/20130320T200040-04-99647.ts
EXTINF:6.006,
http://www.timewarnercable.com/video/channel1/20130320T200040-04-99648.ts
#EXTINF:6.006,
http://www.timewarnercable.com/video/channel1/20130320T200040-04-99649.ts
#EXTINF:6.006,
http://www.timewarnercable.com/video/channel1/20130320T200040-04-99650.ts
EXTINF:6.006,
http://www.timewarnercable.com/video/channel1/20130320T200040-04-99651.ts
#EXTINF:6.006,
http://www.timewarnercable.com/video/channel1/20130320T200040-04-99652.ts
EXTINF:6.006,
http://www.timewarnercable.com/video/channel1/20130320T200040-04-99653.ts
EXTINF:6.006,
http://www.timewarnercable.com/video/channel1/20130320T200040-04-99654.ts
EXTINF:6.006,
http://www.timewarnercable.com/video/channel1/20130320T200040-04-99655.ts
EXTINF:6.006,
http://www.timewarnercable.com/video/channel1/20130320T200040-04-99656.ts
```

APPENDIX B

© Copyright 2014 Time Warner Cable Enterprises LLC All rights reserved

EXTM3U
EXT-X-VERSION:3
EXT-X-TARGETDURATION:7
EXT-X-MEDIA-SEQUENCE:99652
EXTINF:6.006,
http://www.timewarnercable.com/video/channel1/20130320T200040-04-99652.ts
EXTINF:6.006,
http://www.timewarnercable.com/video/channel1/20130320T200040-04-99653.ts
EXTINF:6.006,
http://www.timewarnercable.com/video/channel1/20130320T200040-04-99654.ts
EXTINF:6.006,
http://www.timewarnercable.com/video/channel1/20130320T200040-04-99655.ts
EXTINF:6.006,
http://www.timewarnercable.com/video/channel1/20130320T200040-04-99656.ts
EXTINF:6.006,
http://www.timewarnercable.com/video/channel1/20130320T200040-04-99657.ts
EXTINF:6.006,
http://www.timewarnercable.com/video/channel1/20130320T200040-04-99658.ts
EXTINF:6.006,
http://www.timewarnercable.com/video/channel1/20130320T200040-04-99659.ts
EXTINF:6.006,
http://www.timewarnercable.com/video/channel1/20130320T200040-04-99660.ts
EXTINF:6.006,
http://www.timewarnercable.com/video/channel1/20130320T200040-04-99661.ts

APPENDIX C

© Copyright 2014 Time Warner Cable Enterprises LLC All rights reserved

```
#EXTM3U
EXT-X-VERSION:3
EXT-X-TARGETDURATION:7
EXT-X-MEDIA-SEQUENCE:99647
EXTINF:6.006,
videorecording1/channel1/20130320T200040-04-99647.ts
EXTINF:6.006,
videorecording1/channel1/20130320T200040-04-99648.ts
EXTINF:6.006,
videorecording1/channel1/20130320T200040-04-99649.ts
EXTINF:6.006,
videorecording1/channel1/20130320T200040-04-99650.ts
EXTINF:6.006,
videorecording1/channel1/20130320T200040-04-99651.ts
EXTINF:6.006,
videorecording1/channel1/20130320T200040-04-99652.ts
EXTINF:6.006,
videorecording1/channel1/20130320T200040-04-99653.ts
EXTINF:6.006,
videorecording1/channel1/20130320T200040-04-99654.ts
EXTINF:6.006,
videorecording1/channel1/20130320T200040-04-99655.ts
EXTINF:6.006,
videorecording1/channel1/20130320T200040-04-99656.ts
```

APPENDIX D

© Copyright 2014 Time Warner Cable Enterprises LLC All rights reserved

EXTM3U

EXT-X-VERSION:3

EXT-X-TARGETDURATION:7

EXT-X-MEDIA-SEQUENCE:99647

EXTINF:6.006, videorecording1/channel1/20130320T200040-04-99647.ts

EXTINF:6.006, videorecording1/channel1/20130320T200040-04-99648.ts

EXTINF:6.006, videorecording1/channel1/20130320T200040-04-99649.ts

EXTINF:6.006, videorecording1/channel1/20130320T200040-04-99650.ts

EXTINF:6.006, videorecording1/channel1/20130320T200040-04-99651.ts

EXTINF:6.006, videorecording1/channel1/20130320T200040-04-99652.ts

EXTINF:6.006, videorecording1/channel1/20130320T200040-04-99653.ts

EXTINF:6.006, videorecording1/channel1/20130320T200040-04-99654.ts

EXTINF:6.006, videorecording1/channel1/20130320T200040-04-99655.ts

EXTINF:6.006, videorecording1/channel1/20130320T200040-04-99656.ts

EXTINF:6.006, videorecording1/channel1/20130320T200040-04-99657.ts

EXTINF:6.006, videorecording1/channel1/20130320T200040-04-99658.ts

EXTINF:6.006, videorecording1/channel1/20130320T200040-04-99659.ts

EXTINF:6.006, videorecording1/channel1/20130320T200040-04-99660.ts

EXTINF:6.006, videorecording1/channel1/20130320T200040-04-99661.ts

APPENDIX E

© Copyright 2014 Time Warner Cable Enterprises LLC All rights reserved

```
Main manifest
#EXTM3U
#EXT-X-STREAM-INF:PROGRAM-
ID=1,BANDWIDTH=929472,RESOLUTION=640x480,CODECS="avc1.4d401e,mp4a.40.5"
01.m3u8
#EXT-X-STREAM-INF:PROGRAM-
ID=1,BANDWIDTH=1648384,RESOLUTION=720x480,CODECS="avc1.4d401e,mp4a.40.5"
02.m3u8
#EXT-X-STREAM-INF:PROGRAM-
ID=1,BANDWIDTH=3188480,RESOLUTION=1920x1080,CODECS="avc1.4d4028,mp4a.40.5"
03.m3u8

01.m3u8 elementary stream manifest
#EXTINF:6.006,
videorecording1/channel1/640_480/20130320T200040-04-99647.ts
#EXTINF:6.006,
videorecording1/channel1/640_480/20130320T200040-04-99648.ts
#EXTINF:6.006,
videorecording1/channel1/640_480/20130320T200040-04-99649.ts
#EXTINF:6.006,
videorecording1/channel1/640_480/20130320T200040-04-99650.ts
#EXTINF:6.006,
...

02.m3u8 elementary stream manifest
#EXTINF:6.006,
videorecording1/channel1/720_480/20130320T200040-04-99647.ts
#EXTINF:6.006,
videorecording1/channel1/720_480/20130320T200040-04-99648.ts
#EXTINF:6.006,
videorecording1/channel1/720_480/20130320T200040-04-99649.ts
#EXTINF:6.006,
videorecording1/channel1/720_480/20130320T200040-04-99650.ts
```

EXTINF:6.006,

...

03.m3u8 *elementary stream manifest*

EXTINF:6.006, videorecording1/channel1/1920_1080/20130320T200040-04-99647.ts

EXTINF:6.006, videorecording1/channel1/1920_1080/20130320T200040-04-99648.ts

EXTINF:6.006, videorecording1/channel1/1920_1080/20130320T200040-04-99649.ts

EXTINF:6.006, videorecording1/channel1/1920_1080/20130320T200040-04-99650.ts

EXTINF:6.006,

...

APPENDIX F

© Copyright 2014 Time Warner Cable Enterprises LLC All rights reserved

```
Main manifest
#EXTM3U
#EXT-X-STREAM-INF:PROGRAM-
ID=1,BANDWIDTH=929472,RESOLUTION=640x480,CODECS="avc1.4d401e,mp4a.40.5"
01.m3u8
#EXT-X-STREAM-INF:PROGRAM-
ID=1,BANDWIDTH=1648384,RESOLUTION=720x480,CODECS="avc1.4d401e,mp4a.40.5"
02.m3u8
#EXT-X-STREAM-INF:PROGRAM-
ID=1,BANDWIDTH=3188480,RESOLUTION=1920x1080,CODECS="avc1.4d4028,mp4a.40.5"
03.m3u8

01.m3u8 elementary stream manifest
#EXTINF:6.006,
videorecording1/channel1/640_480/20130320T200040-04-99647.ts
#EXTINF:6.006,
videorecording1/channel1/640_480/20130320T200040-04-99648.ts
#EXTINF:6.006,
videorecording1/channel1/640_480/20130320T200040-04-99649.ts
#EXTINF:6.006,
videorecording1/channel1/640_480/20130320T200040-04-99650.ts
#EXTINF:6.006,
...

02.m3u8 elementary stream manifest
#EXTINF:6.006,
videorecording1/channel1/720_480/20130320T200040-04-99647.ts
#EXTINF:6.006,
videorecording1/channel1/720_480/20130320T200040-04-99648.ts
#EXTINF:6.006,
videorecording1/channel1/720_480/20130320T200040-04-99649.ts
#EXTINF:6.006,
videorecording1/channel1/720_480/20130320T200040-04-99650.ts
#EXTINF:6.006,
```

...

03.m3u8 *elementary stream manifest*
EXTINF:6.006,
videorecording1/channel1/1920_1080/20130320T200040-04-99647.ts
EXTINF:6.006,
videorecording1/channel1/1920_1080/20130320T200040-04-99648.ts
EXTINF:6.006,
videorecording1/channel1/1920_1080/20130320T200040-04-99649.ts
EXTINF:6.006,
videorecording1/channel1/1920_1080/20130320T200040-04-99650.ts
EXTINF:6.006,

...

APPENDIX G

© Copyright 2014 Time Warner Cable Enterprises LLC All rights reserved

EXTM3U

EXT-X-VERSION:3

EXT-X-TARGETDURATION:7

EXT-X-MEDIA-SEQUENCE:99647

EXTINF:6.006, http://www.timewarnercable.com/video/channel1/20130320T200040-04-99647.ts

EXTINF:6.006, http://www.timewarnercable.com/video/channel1/20130320T200040-04-99648.ts

EXT-X-SIGNAL-EXIT:6.006

EXTINF:6.006, http://www.adserver.com/snacks/20130320T200040-04-99649.ts

EXT-X-SIGNAL-RETURN:6.006

EXT-X-DISCONTINUITY

EXTINF:6.006, http://www.timewarnercable.com/video/channel1/20130320T200040-04-99650.ts

EXTINF:6.006, http://www.timewarnercable.com/video/channel1/20130320T200040-04-99651.ts

...

APPENDIX H

© Copyright 2014 Time Warner Cable Enterprises LLC All rights reserved

EXTM3U

EXT-X-VERSION:3

EXT-X-TARGETDURATION:7

EXT-X-MEDIA-SEQUENCE:99647

EXTINF:6.006, videorecording1/channel1/20130320T200040-04-99647.ts

EXTINF:6.006, videorecording1/channel1/20130320T200040-04-99648.ts

EXT-X-SIGNAL-EXIT:12.012

EXTINF:6.006, commercial/beverages/00000.ts

EXTINF:6.006, commercial/beverages/00001.ts

EXT-X-SIGNAL-RETURN:12.012

EXT-X-DISCONTINUITY

EXTINF:6.006, videorecording1/channel1/20130320T200040-04-99650.ts

EXTINF:6.006, videorecording1/channel1/20130320T200040-04-99651.ts

...

What is claimed is:

1. A computerized method for recording a digitally rendered media stream so that it is subsequently accessible to a computerized client device, the computerized method comprising:
   using, at the computerized client device in data communication with a managed network during at least a first time period, at least one data structure to access, via use of at least a portion of an infrastructure of the managed network and consistent with one or more network content delivery quality of service (QoS) guarantees configured by an operator of the managed network, a plurality of digitally rendered media segments of the digitally rendered media stream, the at least one data structure comprising a plurality of uniform resource locators (URLs) indicative of a plurality of respective first network locations of the managed network where the plurality of digitally rendered media segments can be accessed, respectively;
   causing storage of at least a portion of the accessed plurality of digitally rendered media segments in one or more second cloud-based network locations accessible by the computerized client device and used to access the plurality of digitally rendered media segments at the plurality of respective first network locations without using the at least portion of the infrastructure of the managed network;
   causing production of an off-network local data structure with data relating to the one or more second cloud-based network locations, the off-network local data structure comprising a version of the at least one data structure configured based on one or more parameters associated with at least one of the computerized client device so as to be compatible with one or more capabilities of the computerized client device and one or more requirements associated with off-network playback of the digitally rendered media stream; and
   utilizing the off-network local data structure to access, at a second time period and according to the off-network local data structure, the at least portion of the plurality of digitally rendered media segments stored in the one or more second cloud-based network locations to effect the off-network playback of the digitally rendered media stream without the one or more network content delivery QoS guarantees and without utilizing the at least portions of the infrastructure of the managed network such that the at least portion of the plurality of digitally rendered media segments stored in the one or more second cloud-based network locations can be accessed irrespective of connectivity of the computerized client device to the managed network.

2. The computerized method of claim 1, wherein the causing storage of the at least portion of the accessed plurality of digitally rendered media segments in the one or more second cloud-based network locations accessible by the computerized client device comprises causing storage of the at least portion of the accessed plurality of digitally rendered media segments at a network edge device, the network edge device configured to deliver the at least portion of the plurality of digitally rendered media segments to the computerized client device without the one or more network content delivery QoS guarantees.

3. The computerized method of claim 1, further comprising, based at least on the one or more capabilities of the computerized client device, identifying one or more of the accessed plurality of digitally rendered media segments which can be ignored;
   wherein the causing storage of the at least portion of the accessed plurality of digitally rendered media segments in the one or more second cloud-based network locations accessible by the computerized client device comprises not storing the identified one or more of the accessed plurality of digitally rendered media segments.

4. The computerized method of claim 1, further comprising identifying one or more of the accessed plurality of digitally rendered media segments which have been previously stored in the one or more second cloud-based network locations;
   wherein the causing storage of the at least portion of the accessed plurality of digitally rendered media segments in the one or more second cloud-based network locations accessible by the computerized client device comprises not storing the identified one or more of the accessed plurality of digitally rendered media segments.

5. The computerized method of claim 1, wherein the one or more requirements comprise an access restriction configured to ensure that the off-network playback of the digitally rendered media stream is only available for the computerized client device, the access restriction implemented via tracking of attempted off-network playback of the digitally rendered media stream on one or more other devices associated with the computerized client device.

6. The computerized method of claim 1, wherein the one or more requirements comprise an access restriction configured to ensure that one or more rules relating to the off-network playback of the digitally rendered media stream are imposed across both the computerized client device and one or more other devices associated with the computerized client device when considered as a whole, the access restriction enforced by a computerized network process in data communication with at least the computerized client device and the one or more other devices.

7. The computerized method of claim 1, wherein the plurality of digitally rendered media segments accessed via use of the at least portion of the infrastructure of the managed network comprise a plurality of digitally rendered media segments encrypted with first credentials, and the computerized method further comprises:
   decrypting the plurality of encrypted digitally rendered media segments via use of the first credentials; and
   re-encrypting the plurality of decrypted digitally rendered media segments with second credentials, wherein the re-encrypting of the plurality of decrypted digitally rendered media segments with the second credentials enables the plurality of re-encrypted digitally rendered media segments to be securely transferred from the computerized client device to one or more other computerized client devices.

8. The computerized method of claim 1, wherein the plurality of uniform resource locators (URLs) indicative of the plurality of respective first network locations of the managed network where the plurality of respective digitally rendered media segments can be accessed comprises a plurality of URLs associated with respective ones of different entities, the respective ones of the different entities not sharing a common network operator.

9. The computerized method of claim 8, wherein the plurality of URLs associated with the respective ones of the different entities, the respective ones of the different entities not sharing the common network operator, comprise (i) at least one first URL associated with a multiple systems operator (MSO) of the managed network and indicative of the MSO within the at least one first URL, and (ii) at least one second URL associated with third party service provider and indicative of the third party service provider within the at least one second URL.

10. The computerized method of claim 1, wherein the using of the at least one data structure comprises using the at least one data structure to establish a device-based security boundary around at least the computerized client device, the device-based security boundary enabling the operator of the managed network to maintain one or more content protection mechanisms over the plurality of respective digitally rendered media segments outside of the managed network; and the off-network local data structure maintains the device-based security boundary.

11. The computerized method of claim 1, wherein the plurality of respective digitally rendered media segments comprise non-time-based media segments of irregular length.

12. The computerized method of claim 1, wherein at least a portion of the plurality of URLs comprise one or more URLs punctuated with at least one of (i) HTML (HyperText Markup Language) tags or (ii) Javascript, configured to enable dynamic advertisement insertion.

13. The computerized method of claim 1, wherein the production of the off-network local data structure is effected in real-time during rendering of the at least portion of the plurality of digitally rendered media segments at the computerized client device.

14. A computerized method for recording a live digitally rendered media stream, the computerized method comprising:
receiving, at a computerized client device in data communication with a managed network, at least one network data structure associated with the live digitally rendered media stream, the at least one network data structure comprising a plurality of uniform resource locators (URLs), the plurality of URLs indicative of a plurality of respective first network locations of the managed network where a plurality of respective digitally rendered media segments may be accessed;
based at least on the at least one network data structure, accessing at least two of the plurality of digitally rendered media segments from respective ones of the plurality of first network locations, the accessing of the at least two of the plurality of digitally rendered media segments comprising accessing of the at least two of the plurality of digitally rendered media segments consistent with one or more network content delivery quality of service (QoS) guarantees configured by an operator of the managed network;
storing the accessed at least two of the plurality of digitally rendered media segments in one or more second locations accessible to the computerized client device;
producing a local data structure with data relating to the one or more second locations, the local data structure comprising a version of the at least one network data structure modified based on one or more parameters associated with a non-managed internetwork; and
utilizing the local data structure to access, without data communication to the managed network and according to the one or more parameters, the at least two of the plurality of digitally rendered media segments stored in the one or more second locations, the access of the at least two of the plurality of digitally rendered media segments according to the one or more parameters comprising accessing the at least two of the plurality of digitally rendered media segments to render the live digitally rendered media stream without the one or more network content delivery QoS guarantees.

15. The computerized method of claim 14, wherein:
the at least one network data structure establishes a device-based security boundary around at least the computerized client device, the device-based security boundary enabling the operator of the managed network to maintain one or more content protection mechanisms over the plurality of respective digitally rendered media segments outside of the managed network;
the version of the at least one network data structure modified based on the one or more parameters associated with the non-managed internetwork is configured to maintain the device-based security boundary; and
the access, without the data communication to the managed network, of the at least two of the plurality of digitally rendered media segments comprises access of the at least two of the plurality of digitally rendered media segments while the one or more content protection mechanisms are maintained.

16. The computerized method of claim 14, wherein:
the storing the accessed at least two of the plurality of digitally rendered media segments in the one or more second locations accessible to the computerized client device comprises storing the accessed at least two of the plurality of digitally rendered media segments via the non-managed internetwork, and at one or more storage locations of a cloud-based entity associated with the non-managed internetwork; and
the producing the local data structure with the data relating to the one or more second locations comprises producing the local data structure with data relating to the one or more second locations of the cloud-based entity associated with the non-managed internetwork.

17. The computerized method of claim 14, wherein the accessing of the at least two of the plurality of digitally rendered media segments from the respective ones of the plurality of first locations comprises accessing the at least two of the plurality of digitally rendered media segments from one or more universal edge QAM (quadrature amplitude modulation) devices.

18. The computerized method of claim 14, wherein:
the accessing of the at least two of the plurality of digitally rendered media segments comprises accessing the at least two of the plurality of digitally rendered media segments from a portion of a virtual storage apparatus, the portion specifically associated with the computerized client device, such that only the computerized client device can access the portion of the virtual storage apparatus; and
the virtual storage apparatus comprises a plurality of discrete storage apparatus disposed at different physical locations but logically operative as a single storage apparatus.

19. The computerized method of claim 14, wherein the storing of the at least two of the plurality of digitally rendered media segments comprises storing the at least two of the plurality of digitally rendered media segments at a cloud-based entity, the cloud-based entity comprising a network storage location of the managed network, the network storage location specifically designated for use only by the computerized client device or a user associated therewith.

20. The computerized method of claim 19, wherein:
the storing of the at least two of the plurality of digitally rendered media segments at the cloud-based entity comprises storing at least one advertisement associated with the live digitally rendered media stream in a storage location reserved for storage of advertisements only; and
the computerized method further comprises executing computerized logic configured to:
(i) ignore playback of the at least one advertisement based on the computerized client device being within a premises of the user of the computerized client device; and
(ii) cause playback of the at least one advertisement based on the computerized client device being outside of the premises.

21. The computerized method of claim 14, further comprising identifying a portion of the at least one network data structure, the portion indicating at least two incompatible digitally rendered media segments that are incompatible with one or more capabilities of the computerized client device;
wherein the accessing of the at least two of the plurality of digitally rendered media segments is based at least in part on the identifying, and the at least two of the plurality of digitally rendered media segments are compatible with the one or more capabilities of the computerized client device and configured to replace the at least two incompatible digitally rendered media segments.

22. The computerized method of claim 14, further comprising:
identifying a portion of the at least one network data structure that is incomplete; and
causing completion of the portion of the at least one network data structure, the completion based on at least the accessing of the at least two of the plurality of digitally rendered media segments.

23. The computerized method of claim 14, wherein the producing of the local data structure comprises omitting at least one digitally rendered content segment that is incompatible with one or more capabilities of the computerized client device.

24. The computerized method of claim 14, wherein the accessing of the at least two of the plurality of digitally rendered media segments consistent with the one or more network content delivery QoS guarantees comprises accessing the at least two of the plurality of digitally rendered media segments according to a prioritized hierarchy.

25. The computerized method of claim 24, wherein the accessing of the at least two of the plurality of digitally rendered media segments according to the prioritized hierarchy comprises accessing one or more digitally rendered content segments relating to programming content before retrieving the one or more digitally rendered content segments relating to advertising.

26. The computerized method of claim 14, wherein the storing of the at least two of the plurality of digitally rendered media segments in the one or more second locations comprises storing the at least two of the plurality of digitally rendered media segments in a local memory apparatus of the computerized client device.

27. The computerized method of claim 14, further comprising consulting the at least one network data structure for one or more other digitally rendered media segments comprising a first advertisement;

wherein:
the accessing of the at least two of the plurality of digitally rendered media segments comprises accessing the one or more other digitally rendered media segments; and
the producing the local data structure with the data relating to the one or more second locations comprises updating an existing local data structure, the updating comprising replacing, by the computerized client device, a second advertisement with the first advertisement.

28. The computerized method of claim 27, wherein the first advertisement: (i) bears a logical or deterministic relationship to at least one of an operational or business parameter, and (ii) is encoded so as to permit delivery over a designated network distribution path.

29. A computerized client device, the computerized client device comprising:
display apparatus;
processor apparatus; and
storage apparatus in data communication with the processor apparatus, the storage apparatus comprising at least one computer program configured to, when executed on the processor apparatus, cause the computerized client device to:
receive data representative of a network stream data structure, the network stream data structure comprising a plurality of uniform resource locators (URLs) indicative of a plurality of first storage locations of a managed network from which a plurality of respective digitally rendered content elements may be accessed;
utilize the network stream data structure to access, during a first period of time, at least a portion of the plurality of digitally rendered content elements from one or more of the plurality of first storage locations in accordance with one or more content delivery network quality of service (QoS) guarantees configured by an operator of the managed network;
cause storage of at least the portion of the plurality of digitally rendered content elements at a plurality of second storage locations of a second network that is not associated with the managed network;
generate an off-network local stream data structure, the off-network local stream data structure indicative of the plurality of second storage locations of the second network and used by the computerized client device in rendering a digitally rendered media content stream without the one or more content delivery network QoS guarantees;
utilize the off-network local stream data structure to access, during a second period of time, two or more of the at least portion of the plurality of digitally rendered content elements;
reconstruct the digitally rendered media content stream based at least in part on the two or more of the at least portion of the plurality of digitally rendered content elements without the one or more content delivery network QoS; and
cause display, via the display apparatus, of the digitally rendered media content stream, the display comprising a rendering of the digitally rendered media content stream without the one or more content delivery network QoS.

30. The computerized client device of claim 29, wherein:
each of the plurality of first storage locations are accessible to a Data over Cable Service Interface Specification (DOCSIS)-based edge modulator device; and the causation of the storage of the at least portion of the plurality of digitally rendered content elements at the plurality of network locations is enabled via the managed network, and the access of the at least portion of the plurality of digitally rendered content elements comprises a streaming of the at least portion of the plurality of digitally rendered content elements using the DOCSIS-based edge modulator device of the managed network.

31. The computerized client device of claim 29, further comprising a software-based graphical user interface (GUI), the GUI configured to enable a user of the computerized client device to select media content based on at least one of (i) a subscriber-generated content descriptor, or (ii) a default content descriptor;
   wherein the at least one of (i) the subscriber-generated content descriptor, or (ii) the default content descriptor is descriptive of the off-network local stream data structure.

32. The computerized client device of claim 29, wherein:
   the at least one computer program is further configured to, when executed on the processor apparatus, cause the computerized client device to:
      receive input relating to a search term;
      utilize the input to cause performance of a search, the search based on the search term;
      display of a data structure of playlists, the data structure of playlists resulting from the performed search; and
      receive input relating to a selection of a particular playlist from the displayed data structure of playlists; and
   the generation of the off-network local stream data structure comprises generation of a stream manifest for the selected particular playlist.

33. The computerized client device of claim 29, wherein:
   the at least one computer program is further configured to, when executed on the processor apparatus:
      record a plurality of digital media programs according to a pre-arranged schedule; and
      automatically select one or more of the plurality of recorded digital media programs based on data relating to pre-defined selection criteria; and
      the display, via the display apparatus, of the digitally rendered media content stream comprises display of the selected one or more of the plurality of recorded digital media programs.

34. The computerized client device of claim 29 wherein the display, via the display apparatus, of the digitally rendered media content stream comprises display of the digitally rendered media content stream as part a continuous stream on a virtual channel, the virtual channel: (i) comprising digitally rendered content compiled from a plurality of different content sources, and (ii) personalized based at least in part on data relating to one or more preferences, the one or more preferences associated with at least the computerized client device or a user thereof.

35. Computer readable apparatus comprising a non-transitory storage medium, the non-transitory storage medium comprising at least one computer program having a plurality of instructions, the plurality of instructions configured to, when executed on a processing apparatus, cause a computerized client device to:
   obtain, at the computerized client device, first data, at least a portion of the first data relating to a network stream manifest, the network stream manifest comprising a plurality of uniform resource locators (URLs) indicative of a plurality of locations of a network server apparatus from which a plurality of respective digitally rendered content elements may be downloaded;
   based at least in part on the network stream manifest, download individual ones of the plurality of digitally rendered content elements from respective ones of the plurality of locations, the download of the individual ones of the plurality of digitally rendered content elements in accordance with one or more quality of service (QoS) requirements, the one or more QoS requirements configured by a network operator of a managed content delivery network;
   store the downloaded ones of the plurality of digitally rendered content elements in one or more second network locations of a network storage apparatus of the managed content delivery network; and
   cause at least one of (i) a generation, or (ii) an update of an internal stream manifest to identify the one or more second network locations, the internal stream manifest disposed within the computerized client device and used by the computerized client device in rendering at least a portion of the individual ones of the plurality of digitally rendered content elements without the one or more QoS requirements.

36. The computer readable apparatus of claim 35, wherein the at least one of (i) the generation, or (ii) the update of the internal stream manifest is effected in real-time during the rendering of at least the portion of the individual ones of the plurality of digitally rendered content elements.

37. The computer readable apparatus of claim 35, wherein:
   the obtainment of the first data comprises retrieval of at least one indication of an advertisement insertion time stamp associated with a digital media stream; and
   the plurality of instructions are further configured to, when executed on the processing apparatus, cause the computerized client device to:
      select one or more advertisement content elements of the digital media stream for replacement according to one or more preferences, the one or more preferences associated with the computerized client device or a user thereof; and
      during each playback instance of the one or more advertisement content elements, dynamically replace, via at least the computerized client device, the one or more advertisement content elements with one or more replacement advertisement content elements at the advertisement insertion time stamp.

38. The computer readable apparatus of claim 37, wherein the plurality of instructions are further configured to, when executed on the processing apparatus, cause the computerized client device to:
   report, to a service provider and via transmission of a data message, when the one or more replacement advertisement content elements have been played such that the service provider can account for each view of one or more advertisements respectively associated with the one or more replacement advertisement content elements.

39. The computer readable apparatus of claim 35, wherein:
   the plurality of instructions are further configured to, when executed on the processing apparatus, cause the computerized client device to:
      based on receipt of second data representative of a request for playback of a digital media stream, retrieve the internal stream manifest;

determine whether the playback of the digital media stream is authorized; and based on a determination that the playback of the digital media stream is authorized, cause display, at the computerized client device, of the digital media stream; and the playback comprises reconstruction of the digital media stream, the reconstruction comprising (i) utilization of at least the stored ones of the plurality of digitally rendered content elements, and (ii) omission of at least one digitally rendered content element that is incompatible with one or more capabilities of the computerized client device.

40. The computer readable apparatus of claim 35, wherein the internal stream manifest comprises one or more subscriber-generated content descriptors utilized used by the computerized client device to identify one or more of the downloaded ones of the plurality of digitally rendered content elements stored in the one or more second network locations.

41. The computer readable apparatus of claim 35, wherein at least two of the plurality of URLs are each associated with a respective different type of service.

* * * * *